United States Patent
Canoy et al.

(10) Patent No.: US 10,061,328 B2
(45) Date of Patent: Aug. 28, 2018

(54) AUTONOMOUS LANDING AND CONTROL

(71) Applicant: QUALCOMM Incorporated, San Diego, CA (US)

(72) Inventors: Michael-David Nakayoshi Canoy, San Diego, CA (US); Yinyin Liu, San Diego, CA (US); Kiet Tuan Chau, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/855,504

(22) Filed: Sep. 16, 2015

(65) Prior Publication Data
US 2017/0045894 A1 Feb. 16, 2017

Related U.S. Application Data

(60) Provisional application No. 62/204,051, filed on Aug. 12, 2015.

(51) Int. Cl.
| | |
|---|---|
| *B64C 39/02* | (2006.01) |
| *G05D 1/10* | (2006.01) |
| *G08G 5/00* | (2006.01) |
| *G08G 5/04* | (2006.01) |
| *G06K 9/00* | (2006.01) |
| *G08G 5/02* | (2006.01) |

(52) U.S. Cl.
CPC ........... *G05D 1/101* (2013.01); *G06K 9/0063* (2013.01); *G08G 5/0008* (2013.01);
(Continued)

(58) Field of Classification Search
CPC .. G05D 1/101; B64C 39/024; B64C 2201/18; B64C 2201/127; B64C 2201/141; G08G 5/0078; G08G 5/04; G08G 5/0008
See application file for complete search history.

(56) References Cited

U.S. PATENT DOCUMENTS

5,521,817 A * 5/1996 Burdoin ............... G05D 1/0027
244/190
8,315,748 B2 11/2012 Lee
(Continued)

FOREIGN PATENT DOCUMENTS

| CN | 201666850 U | 12/2010 |
| WO | 2015108588 A2 | 7/2015 |

OTHER PUBLICATIONS

Saluki Engineering Company: "Automatic Landing Pad," SEC Project #: S11-63-ICARUSLP, Apr. 19, 2011, 53 pages.
(Continued)

*Primary Examiner* — Alan D Hutchinson
(74) *Attorney, Agent, or Firm* — The Marbury Law Group, PLLC

(57) ABSTRACT

Various embodiments provide methods for controlling landings of a UAV in a landing zone including a plurality of landing bays. Various embodiments include a method implemented on a computing device for receiving continuous real-time sensor data from a transceiver and from sensors onboard the UAV, and detecting a target landing bay within the plurality of landing bays within the landing zone that is available for landing based on the continuous real-time sensor data. Orientation and position coordinates for landing in the target landing bay may be calculated based on the continuous real-time sensor data. Information regarding positions and flight vectors of a plurality of autonomous UAVs may be obtained, and a flight plan for landing in the target landing bay may be generated based on the orientation and the position coordinates, positions and flight vectors of the plurality of autonomous UAVs and a current orientation and position of the UAV.

25 Claims, 9 Drawing Sheets

(52) U.S. Cl.
CPC ......... *G08G 5/0013* (2013.01); *G08G 5/0039* (2013.01); *G08G 5/0056* (2013.01); *G08G 5/0069* (2013.01); *G08G 5/0078* (2013.01); *G08G 5/025* (2013.01); *B64C 39/024* (2013.01); *B64C 2201/024* (2013.01); *B64C 2201/027* (2013.01); *B64C 2201/108* (2013.01); *B64C 2201/123* (2013.01); *B64C 2201/127* (2013.01); *B64C 2201/128* (2013.01); *B64C 2201/141* (2013.01); *B64C 2201/18* (2013.01)

(56) References Cited

U.S. PATENT DOCUMENTS

| | | | |
|---|---|---|---|
| 8,600,589 | B2 | 12/2013 | Mendez-Rodriguez et al. |
| 8,955,800 | B2 | 2/2015 | McGeer et al. |
| 2009/0306840 | A1 | 12/2009 | Blenkhorn et al. |
| 2011/0264309 | A1* | 10/2011 | Molander ............... G01S 11/12 701/11 |
| 2012/0277934 | A1 | 11/2012 | Ohtomo et al. |
| 2013/0162632 | A1* | 6/2013 | Varga .................... G06T 19/006 345/419 |
| 2014/0319272 | A1 | 10/2014 | Casado Magaña et al. |
| 2016/0122038 | A1* | 5/2016 | Fleischman ............... B64F 1/20 701/2 |
| 2016/0275801 | A1* | 9/2016 | Kopardekar ......... G08G 5/0043 |
| 2016/0378121 | A1* | 12/2016 | Shue ...................... G05D 1/105 701/7 |

OTHER PUBLICATIONS

Saripalli S., et al., "Vision-Based Autonomous Landing of an Unmanned Aerial Vehicle," IEEE International Conference on Robotics and Automation, 2002, pp. 2799-2804.

* cited by examiner

AUTONOMOUS LANDING AND CONTROL

RELATED APPLICATIONS

The present application claims the benefit of priority to U.S. Provisional Application No. 62/204,051, entitled "Autonomous Landing and Control System" filed Aug. 12, 2015, the entire contents of which are hereby incorporated by reference.

BACKGROUND

Autonomous landings are an important capability that unmanned aerial vehicle (UAV) systems should support, especially with the increasing use of UAVs in society and industry. Some UAV systems (e.g., rotorcraft drones, etc.) may be configured to perform autonomous landing procedures using global positioning system (GPS) functionalities. For example, some UAVs can use GPS to land relative to area, such as using a "return to launch" (RTL) functionality that simply allows the drones to go back to takeoff area coordinates. However, in addition to having little use when UAVs are without GPS signal coverage, such GPS-based navigation capabilities may not provide enough precision for a UAV to land in an area that accommodates a large number of UAVs and/or that has limited landing space (e.g., a warehouse or distribution center). For example, if a GPS failure or error is encountered, a UAV may only be able to land within several meters of a takeoff point, enabling a simplistic touchdown procedure that is far too imprecise for a densely organized warehouse or the like.

SUMMARY

Various embodiments provide methods, devices, systems, and non-transitory process-readable storage media for safely controlling landing of an autonomous unmanned aerial vehicle (UAV) in a landing zone including a plurality of landing bays while flying among a plurality of autonomous UAVs. In some embodiments, a method performed by a processor of a UAV may include receiving continuous real-time sensor data, detecting a target landing bay within the plurality of landing bays within the landing zone that is available for landing based on the continuous real-time sensor data, calculating an orientation and position coordinates for landing in the target landing bay based on the continuous real-time sensor data, obtaining information regarding positions and flight vectors of the plurality of other UAVs, generating a flight plan for landing in the target landing bay based on the orientation and the position coordinates, positions and flight vectors of the plurality of other UAVs, and a current orientation and position of the UAV, and performing the flight plan for landing in the target landing bay.

In some embodiments, the continuous real-time sensor data may be received from sensors on board the UAV. In some embodiments, obtaining information regarding the positions and flight vectors of the plurality of other UAVs may include obtaining camera imagery via a camera, wherein the camera may be one of the sensors on board the UAV, tracking the plurality of other UAVs using the camera imagery, and calculating the positions and flight vectors of the plurality of other UAVs based on the camera imagery and the UAV's own position and flight vectors.

In some embodiments, detecting the target landing bay from the plurality of landing bays within the landing zone that is available for landing based on the continuous real-time sensor data may include obtaining camera imagery via a camera, wherein the camera may be one of the sensors on board the UAV, determining whether the camera imagery may include imagery of an assigned landing bay, and detecting within the camera imagery of an open landing bay that is available for landing in response to determining that the camera imagery does not include the imagery of the assigned landing bay. In some embodiments, the imagery of the assigned landing bay or the imagery of the open landing bay may be imagery of a landing pattern that may include at least a circle circumscribing an asymmetric symbol, wherein each hemisphere of the asymmetric symbol may be different than an opposite hemisphere of the asymmetric symbol such that the landing pattern indicates a global orientation. In some embodiments, calculating the orientation may include calculating the orientation based on a comparison of a current heading of the UAV to the global orientation of the asymmetric symbol in the imagery of the landing pattern.

In some embodiments, the continuous real-time sensor data may be received via a transceiver on board the UAV. In some embodiments, obtaining information regarding the positions and flight vectors of the plurality of other UAVs may include receiving position and flight vector reports from the plurality of other UAVs via the transceiver. Some embodiments may include continuously transmitting reports of the UAV's own position and flight vector via the transceiver.

Some embodiments may include identifying an exception condition based on the continuous real-time sensor data and the flight plan for landing in the target landing bay, halting performance of the flight plan for landing in the target landing bay in response to identifying the exception condition based on the continuous real-time sensor data and the flight plan for landing in the target landing bay, and performing exception-handling operations based on the identified exception condition. In some embodiments, performing the exception-handling operations may include detecting an alternative target landing bay from the plurality of landing bays within the landing zone that is available for landing based on the continuous real-time sensor data, calculating an alternative orientation and alternative position coordinates for landing in the alternative target landing bay based on the continuous real-time sensor data, adjusting the flight plan for landing in the alternative target landing bay based on the alternative orientation, the alternative position coordinates, and the current orientation and position of the UAV, and performing the flight plan for landing in the alternative target landing bay. In some embodiments, detecting the alternative target landing bay from the plurality of landing bays within the landing zone that is available for landing based on the continuous real-time sensor data may include performing operations to adjust a perspective of the UAV by changing one or more of an altitude, a pitch setting, a roll setting, or a yaw setting of the UAV, and obtaining the continuous real-time sensor data in the adjusted perspective.

In some embodiments, performing the exception-handling operations may include adjusting a parameter of a sensor on board the UAV that is configured to obtain the continuous real-time sensor data, wherein the parameter may include one or more of a zoom setting of a camera and a focus setting of the camera. In some embodiments, identifying the exception condition based on the continuous real-time sensor data may include determining that the target landing bay is obstructed based on the continuous real-time sensor data, and wherein halting performance of the flight plan for landing in the target landing bay in response to identifying the exception condition may include halting the flight plan for landing in the target landing bay in response to determining that the target landing bay is obstructed.

In some embodiments, identifying the exception condition based on the continuous real-time sensor data may include determining whether the UAV has lost track of the target landing bay based on the continuous real-time sensor data, and wherein halting performance of the flight plan for landing in the target landing bay in response to identifying the exception condition may include halting the flight plan for landing in the target landing bay in response to determining that the UAV has lost track of the target landing bay based on the continuous real-time sensor data. In some embodiments, identifying the exception condition based on the continuous real-time sensor data and the flight plan for landing in the target landing bay may include continuously monitoring positions and flight vectors of the plurality of other UAVs while performing the flight plan for landing in the target landing bay, calculating a probability of a mid-air collision occurring with one or more of the plurality of other UAVs while following the flight plan for landing in the target landing bay based on the positions and flight vectors of the plurality of other UAVs, and performing the exception-handling operations based on the identified exception condition may include adjusting the flight plan for landing in the target landing bay in response to determining that the calculated probability of the mid-air collision occurring exceeds a safety threshold.

Some embodiments may further include determining whether the UAV is beginning an approach into the landing zone based on the continuous real-time sensor data, wherein detecting the target landing bay from the plurality of landing bays within the landing zone that is available for landing based on the continuous real-time sensor data may include detecting the target landing bay within the landing zone based on the continuous real-time sensor data in response to determining that the UAV is beginning the approach. In some embodiments, determining that the UAV is beginning the approach into the landing zone based on the continuous real-time sensor data may include comparing coordinates of the UAV from the continuous real-time sensor data to coordinates for the landing zone. In some embodiments, determining that the UAV is beginning the approach into the landing zone based on the continuous real-time sensor data may include detecting imagery of the landing zone within the continuous real-time sensor data.

In some embodiments, calculating the position coordinates for landing in the target landing bay based on the continuous real-time sensor data may include calculating an altitude of a surface of the target landing bay and a center point of the surface of the target landing bay. In some embodiments, the continuous real-time sensor data may include one or more of location data received from global positioning system receiver, audio data from a microphone, movement data from an accelerometer, and orientation data from a gyroscope.

Further embodiments include a UAV having a processor configured with processor-executable instructions for performing operations of the methods described above. Further embodiments include a non-transitory processor-readable medium on which is stored processor-executable instructions configured to cause a computing device to perform operations of the methods described above. Further embodiments include a communication system including a computing device configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to an electronic device equipped with at least a processor. Examples of computing devices may include mobile devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

Figure 2:
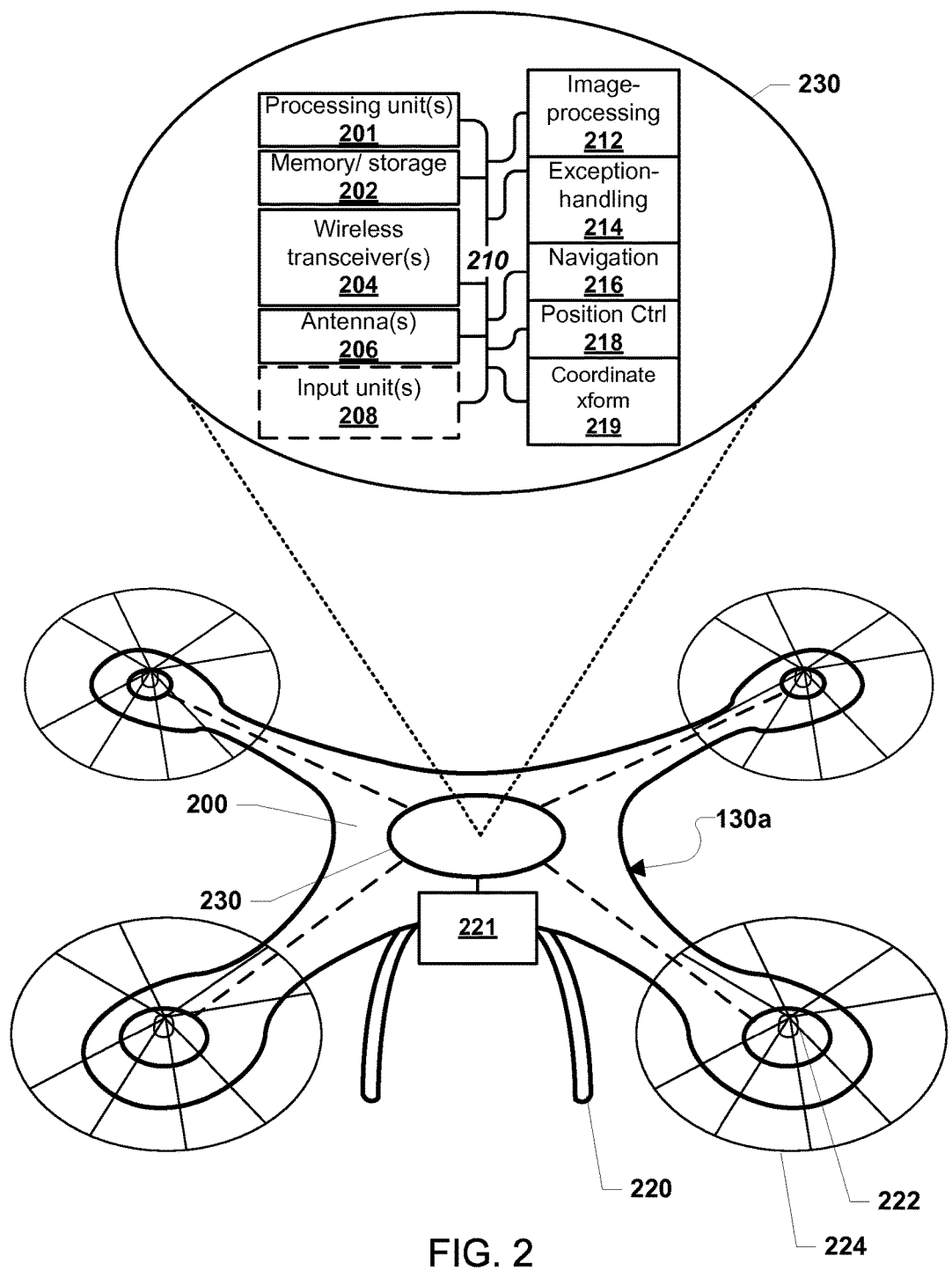
FIG. 2 is a component block diagram of an unmanned aircraft vehicle (UAV) suitable for use in various embodiments.

The term "unmanned aircraft vehicle" or "UAV" is used herein to refer to various types of aerial vehicles that include a processor and may be capable of flying without any human interaction (i.e., autonomous) and/or with some human interaction (e.g., remotely providing flight instructions to be executed by a processing unit for takeoff and landings, etc.). For example, UAVs may include aerial drones of various design types capable of executing vertical lift-offs/landings, such as helicopter-type drones configured with any number of rotors (e.g., quadcopter drones having four rotors, etc.). An example rotorcraft-type UAV is illustrated in FIG. 2.

Precise autonomous landings are an essential function for unmanned aerial vehicle (UAV) systems used in compact or highly trafficked environments (e.g., warehouses, distribution centers, etc.). Conventional autonomous landing schemes may rely on imprecise GPS and/or may not factor-in orientation for a vehicle. For example, some conventional landing schemes may utilize sensors and image-processing to control UAVs to simply land on typical "helipad" markers in test scenarios, without explicit regard to adjacent landing spaces and/or simultaneously active UAVs. These conventional schemes may not enable a precise landing required for close-quarter environments that may house large fleets of concurrently operating UAVs. Comprehensive and precise landing procedures, including exception-handling routines, are needed to support the growing needs of commercial UAV use.

Various embodiments provide methods, UAVs, systems, and non-transitory process-readable storage media for safely and efficiently controlling autonomous landings of UAVs, particularly in locations having a plurality of landing bays and populated with a plurality of other UAVs flying independently. In general, a UAV may be configured with sensor data-guided autonomous landing procedures that enable high-precision positioning and orienting within a multi-bay landing zone occupied by a plurality of concurrently active UAVs. The UAV may continually analyze real-time sensor data, such as camera imagery and/or data received via wireless signaling, to detect and track landing bays (e.g., landing pads or "parking spaces"). For example, the UAV may evaluate camera imagery to detect special landing patterns that are designed to provide both location and global orientation information necessary for identifying the manner in which the UAV should move and be oriented for landing in a particular landing bay.

While in route to a target landing bay, the UAV may continually analyze the real-time sensor data and utilize comprehensive exception detection and exception-handling mechanisms to overcome unexpected or emergency conditions. For example, the UAV may perform midair maneuvers (e.g., gain elevation) to improve sensor data for use with a computer vision algorithm in response to losing track of the target landing bay in real-time camera imagery. As another example, when calculating that a mid-air collision is likely, the UAV may change a related flight path, halt the execution of a flight plan, and/or signal for pilot assistance and await remote pilot commands. By using a system that provides versatility in identifying position and orientation of landing bays, executing real-time adjustments, and performing fall-back procedures in exception conditions, the techniques of various embodiments enable autonomous landing that may be simply calibrated and implemented in various commercial spaces.

In some embodiments, the UAV may execute a computer vision algorithm that is configured to identify and track multiple landing bays in an environment by detecting special landing patterns. For example, the UAV may distinguish between distinct graphical representations within captured sensor data (e.g., camera imagery) to identify available or unavailable landing bays. Such landing patterns may be designed to be processed from all viewing angles in order to identify a landing position and global orientation. With an identified landing pattern in a landing bay, the UAV may calculate a global position of the landing pattern based on known coordinates of the UAV along with sensor configuration data (e.g., angle of the camera capturing the imagery, etc.). Unlike typical landing bay markings, which may be ambiguous with regard to a preferred direction (e.g., a helipad marking that is a circle around an uppercase letter 'H'), the special landing patterns may enable the UAV to find both a center point as well as a preferred rotational orientation for a UAV to properly and precisely land in a target landing bay.

In various embodiments, landing patterns may include a circle (or other symmetric shape) that is suitable for robust and efficient detection. Such a circle may serve as a boundary identifier for landing patterns. The center of the circle of a landing pattern may be detected and used to indicate the center location of the corresponding landing bay. For example, using image-processing routines, the UAV may identify concentric circles of a landing pattern and determine the center point of an innermost circle within a landing bay in a warehouse. In some embodiments, landing patterns may utilize various boundary identifiers, such as predefined shapes, or alternatively may utilize no boundary identifier (e.g., no circle surrounding other symbols, etc.). In various embodiments, landing patterns may also include a special asymmetric symbol that clearly indicates an orientation of the respective landing bay, such as by indicating a preferred direction for orienting the UAV for landing. For example, a landing pattern may be a circle around an asymmetric alphanumeric character (e.g., a lowercase 'h' within a circle). In various embodiments, landing patterns (e.g., the special asymmetric symbols of landing patterns) may include letters, numbers, symbols, shapes, and/or other patterns that indicate orientation of landing bays such that, upon analysis (e.g., image-processing), the UAV may identify how to be oriented and otherwise positioned for precise landings in the landing bays.

In some embodiments, the computer vision algorithm executed by a processor of the UAV may utilize a combination of standard computer vision functions in order to detect special landing patterns. Such a computer vision algorithm may include at least operations for preprocessing sensor data (e.g., blurring to remove background noise and small features, (adaptive local) histogram equalization, contrast enhancement, and binarization, etc.), identifying contours of images, detecting circle/ellipses indicative of special target landing patterns (or landing circles), identifying landing patterns, detecting landing markers inside landing patterns, selecting/tracking landing markers (or symbols), and generating landing direction and orientation based on the imagery. In some embodiments, the computer vision algorithm executed by the UAV may employ a versatile calibration process to let a system/user configure the geometry relations that should be looked for to identify valid landing bays within imagery. For example, the UAV may be configured to run an optional setup procedure such that a vision algorithm may be adjusted using interfaces available to a designer or user.

In some embodiments, the UAV may perform various exception-detecting and exception-handling operations in order to avoid circumstances in which initial flight plans for landing may fail or cause unacceptable conditions within the multi-bay landing zone. For example, the UAV may perform predefined movement routines in response to determining that a target landing bay is occupied. Examples of determinations that a landing bay is occupied include determining that another UAV has already landed in the bay and recognizing that a box or another object is positioned on the landing bay surface. In some embodiments, in response to determining that an exception condition exists (e.g., a probable collision between UAVs or a building, a target landing bay is obstructed, a flight plan is impossible, etc.), the UAV may generate an exception causing an exception-handling system to route a assistance request message to a remote support source. For example, the UAV may send a help request to a human operator (i.e., a remote pilot) to take over a landing when an assigned target landing bay is occupied or to otherwise assist with addressing the error (e.g., clearing the obstruction). Alternatively, the UAV may identify a nearby flat surface via image-processing to use for an emergency landing.

The following is a non-limiting illustration of a method performed by a UAV (e.g., quadcopter-type UAV, etc.) according to some embodiments. Based on obtained continuous real-time sensor data (e.g., camera imagery, incoming wireless signals from beacons/remote server, etc.), the UAV may determine that the UAV has entered within an initial approach range (e.g., a current distance to a landing zone is less than a predefined threshold, etc.). The UAV may determine whether an assigned target landing bay from a plurality of landing bays is identified based on the continuous real-time sensor data, such as by processing image data depicting a "hangar" area of a warehouse landing zone. The assigned target landing bay may be pre-assigned (e.g., prior to beginning a flight plan or mission) or provided to the UAV upon approach to the landing zone. If the assigned target landing bay is not identified, the UAV may make various midair movements to improve sensor data gathering, such as by raising or lowering altitude, performing a circle maneuver, traveling closer to the assigned target landing bay, etc. For example, the midair movements may include movements instructed via predefined routines stored on the UAV. During the midair movements, the UAV may conduct exception-handling operations to determine whether an input is required from a human remote pilot or whether to change midair movements to avoid objects (e.g., other drones, trees, buildings, etc.).

When the target landing bay is identified in the sensor data (e.g., due to the midair movements or not), the UAV may continually perform sensor data processing operations, such as via a computer vision algorithm, to identify the position and orientation of the target landing bay and generate movement instructions for landing safely. If the UAV determines that the target landing bay has been lost in the sensor data, that target landing bay is obstructed, and/or that other UAVs may likely collide with the UAV, exception handling operations may be performed (e.g., call human pilot, halt and ascend to obtain different sensor data, etc.). The exception-handling operations may include receiving a new landing bay assignment from a remote server, receiving override controls from a remote pilot, and/or identifying currently open alternative landing bays based on real-time sensor data. The UAV may continue the landing procedure by performing position control operations to land based on image-processing of the target landing bay, such as by lowering until the altitude of the UAV is at a calculated touchdown elevation.

Various embodiments provide techniques that enable autonomous UAVs to execute precise, safe landings within landing zones that support a plurality of landing bays used by a plurality of UAVs. Some embodiments may or may not utilize training procedures, neural networks, and/or similar approaches for processing data to identifying appropriate landing scenarios. However, unlike conventional techniques, methods, systems, and the like according to various embodiments may use only a finite, specific set of symbols in such data identification procedures, thereby reducing any potential training requirements (e.g., training data set size, timer, etc.). For example, some conventional techniques require a network to be trained by thousands of pre-collected images to cover all viewing angles and lighting conditions of landing zones, and therefore do not flexibly accommodate a large user group that can choose respective visual patterns and/or select from a plurality of available landing bays. The methods of various embodiments enable UAVs to efficiently and independently determine whether landing bays are available as well as determine how to approach landings based on recognizing special landing patterns that indicate at least a global orientation for landings.

Conventional UAV landing techniques do not address the complicated environment of a multi-bay landing zone that supports a plurality of UAVs, each UAV potentially flying around the airspace of the landing zone and landing at different times. The various embodiments are further distinguished from conventional schemes by supporting robust exception-detection and exception-handling routines at UAVs to account for emergency or unexpected conditions and provide support needed for safety and efficiency. For example, a UAV may request remote pilot overrides in response to identifying probable mid-air collisions with other UAVs, an obstructed target landing bay, and/or other conditions that may prevent the UAV from autonomously completing a landing. Such exception-detection and handling routines differ from conventional waive-off procedures typically used with fixed-wing aircraft landing scenarios, as the embodiment routines enable aggressive, immediate landing attempts at different landing bays or other corrective actions. By continuously evaluating potential landing zones as well as the activities of other UAVs, UAVs implementing various embodiments may be used efficiently within parking lots, warehouses, and other environments in which it is beneficial to use numerous UAVs in a limited space.

Figure 1:
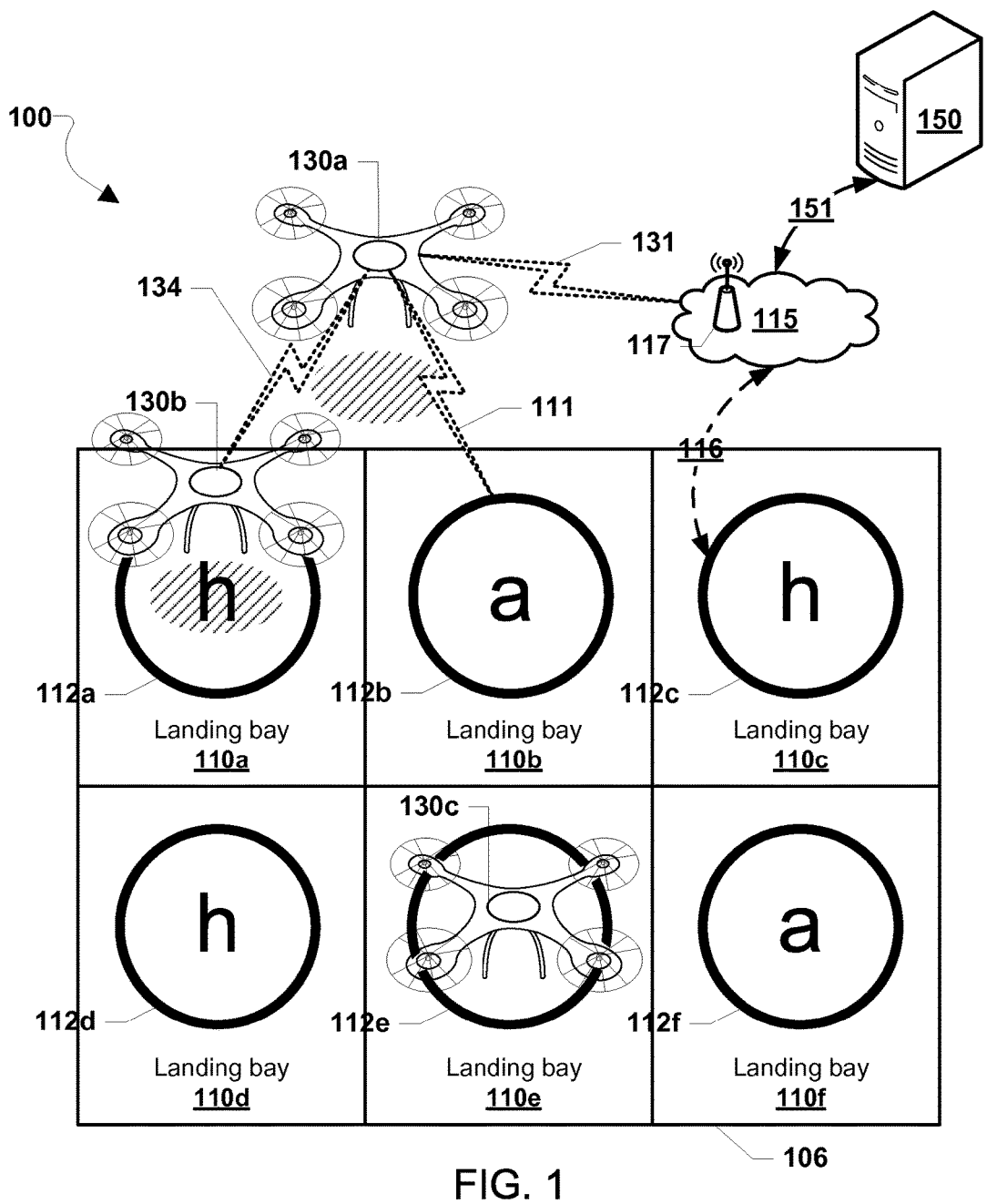
FIG. 1 is a component block diagram of a communication system that includes a plurality of autonomous unmanned aerial vehicles (e.g., quadcopters, helicopters, etc.) configured to landing in a multi-bay area (e.g., a warehouse, distribution center, field, etc.) according to various embodiments.

FIG. 1 illustrates a communication system 100 that includes a plurality of autonomous unmanned aerial vehicles (UAVs) configured to land in a multi-bay landing zone 106 (e.g., a warehouse, distribution center, field, etc.). For example, the communication system 100 may be suitable for enabling a fleet of quadcopter UAVs (or other type(s) of UAVs), such as a first UAV 130a, a second UAV 130b, and a third UAV 130c, to safely land within the multi-bay landing zone 106. At any given time, the various UAVs 130a-130c may be in different states of mission deployment (e.g., flying to or from a mission), landing, taking-off, and/or landed (or "parked"). For example, the first UAV 130a may be beginning an approach to land within the landing zone 106, the second UAV 130b may be lifting-off to leave the landing zone 106 for a flight mission (e.g., a delivery mission, etc.), and the third UAV 130c may be stationary while awaiting a lift-off command to begin a next flight mission.

In some embodiments, the landing zone 106 may include a plurality of landing bays 110a-110f, such as individual sections of the floor of the landing zone 106 suitable for landings and/or storage of UAVs 130a-130c. In some embodiments, the landing bays 110a-110f may be marked-off by paint, similar to parking spaces for conventional automobiles, and may encompass an amount of square footage that may be adequate for accommodating the dimensions of particular types of UAVs that are operating within the landing zone 106. For example, the landing bays 110a-110f may each have a width and length to fit a particular design/make/model of UAV used within the landing zone 106.

Each of the plurality of landing bays 110a-110f may include markings or other information that may be used by the UAVs 130a-130c to identify potential target landing bays for landing. In some embodiments, the landing bays 110a-110f may include static markings (e.g., painted markings on the surface of the floor, etc.) that indicate a landing bay identity (e.g., a parking spot number). In various embodiments, landing bay markings may include a landing pattern that comprises a circle around an asymmetrical pattern or symbol. For example, a second landing bay 110b may include a representation of a lowercase letter 'a' within a circle (or other symmetric shape), a third landing bay 110c may include a representation of a lowercase letter 'h' within a circle, and so forth.

The center of the circle of a landing pattern may be identified via image-processing (and/or via other suitable sensors) by the UAVs 130a-130c and used as a position for landing within the respective landing bays 110a-110f. The asymmetric symbols within the circles may be identified via the image-processing by the UAVs 130a-130c and evaluated to provide an orientation for properly landing within the respective landing bays 110a-110f. Such symbols may be asymmetric such that each hemisphere of the symbol is different from an opposite hemisphere of the asymmetric symbol. In other words, the asymmetric symbols may be configured such that global orientation may be determined without ambiguity regardless of the angle used to capture imagery of the symbols.

In some embodiments, landing patterns may provide additional or dynamic information about the assignments and/or availability of the respective landing bays 110a-110f. For example, a first landing bay 110a that is currently obstructed or semi-permanently assigned to the second UAV 130b may include a first asymmetric symbol within a circle (e.g., an 'h' within a circle), indicating that the first UAV 130a may not land in the first landing bay 110a. As another example, a second landing bay 110b that is open and not assigned any UAV may include a second asymmetric symbol within a circle (e.g., an 'a' within a circle), indicating that the first UAV 130a may land in the second landing bay 110b.

In some embodiments, landing patterns may be provided via landing bay devices 112a-112f placed within each of the landing bays 110a-110f. Such landing bay devices 112a-112f may be devices that are placed on top of or recessed within the floor of the landing zone 106 and that may include various components for displaying visual information. For example, the landing bay devices 112a-112f may include screens, bulbs, and/or other visual indicators that may be static or dynamically configured to display status information or identity information associated with the respective landing bays 110a-110f. In some embodiments, such landing bay devices 112a-112f may include various components (e.g., as described with reference to FIG. 8). In some embodiments, the landing bay devices 112a-112f may function as beacon devices that communicate data to nearby devices via wireless transceivers. In some embodiments, the landing bay devices 112a-112f may utilize wired or wireless connections 116 to a network 115, such as an Ethernet, Wi-Fi®), or cellular connection to communicate with a remote server 150. In some embodiments, the landing patterns may be dynamically displayed via a projector (located elsewhere) for projecting the landing patterns on the floor.

The UAVs 130a-130c may be configured with various communication functionalities, such as long-range radio transceivers and antenna, and the UAVs 130a-130c may exchange wireless signals with various other devices. In particular, the UAVs 130a-130c may directly signal one another via a peer-to-peer wireless connection 134, such as via Wi-Fi®, Bluetooth®, etc. For example, to assist in collision detection operations, the first UAV 130a and the second UAV 130b may transmit messages to each other indicating current flight plans, movement vectors, positions, altitudes, sensor data, orientations, speeds, landing bay assignments, and/or other operating parameters.

In some embodiments, the UAVs 130a-130c may be configured to communicate with the landing bay devices 112a-112f via wireless connection 111. For example, via Wi-Fi® or Bluetooth® signaling, the first UAV 130a may exchange signals with the second landing bay device 112b that indicate whether the second landing bay 110b is assigned to any UAV, is obstructed due to various objects (e.g., a stationary UAV, a foreign object, etc.), and/or otherwise is available for landing by the first UAV 130a.

In some embodiments, the UAVs 130a-130c may be configured to utilize a wireless connection 131 to exchange data with various remote data sources via a network 115, such as the server 150 (or other server) connected to the network 115 via a wired or wireless connection 151. For example, the first UAV 130a may use the wireless connection 131 to exchange signals with one or more access point(s) 117 (e.g., a Wi-Fi® router, etc.) associated with the network 115. The server 150 may perform various functions, such as message routing between remote pilots and the UAVs 130a-130c and/or landing bay devices 112a-112f, and/or assignment scheduling, such as tracking the current assignments of UAVs 130a-130c to the various landing bays 110a-110f. For example, the server 150 may generate, relay, or otherwise transmit override commands that instruct the UAVs 130a-130c to perform midair movements, change target landing bays, report a current location, activate a hover mode, and/or other operations.

In some embodiments, the UAVs 130a-130c may be dynamically assigned landing bays 110a-110f through assignment messages from the server 150 via the network 115. For example, the first UAV 130a may initially be assigned to the first landing bay 110a, such as via a message from the server 150 received via the wireless connection 131. However, upon approach to the landing zone 106 after completing a delivery mission, the first UAV 130a may determine that the first landing bay 110a is obstructed by the second UAV 130b, and thus may transmit a message to the server 150 requesting a new assignment. In some embodiments, the second UAV 130b (or another device within the landing zone 106) may transmit a message to the server 150 indicating that the first landing bay 110a is already occupied. In response, the server 150 may transmit an assignment message that instructs the first UAV 130*a* to land in a currently unassigned second landing bay 110*b*. Such messages from the server 150 may be triggered at any time or in response to an event, such as the server 150 receiving messages indicating that the first UAV 130*a* is near the landing zone 106.

In some embodiments, instead of the first UAV 130*a* exchanging messages directly with the server 150, the first UAV 130*a* may use the second UAV 130*b* (or any other nearby UAV, such as the third UAV 130*c*) to route communications to the sever 150, and vice versa. For example, as the first UAV 130*a* may send wireless messages to the second UAV 130*b* for relaying to the server 150 via a local backhaul. As another example, in response to detecting that the second UAV 130*b* is blocking the first landing bay 110*a* assigned to the first UAV 130*a*, the first UAV 130*a* may transmit a request to the server 150 via the second UAV 130*b* that requests a new assigned landing bay. In response, the server 150 may send data indicating a new landing bay assignment to the first UAV 130*a* via the second UAV 130*b* or directly.

FIG. 2 illustrates an exemplary rotorcraft-type unmanned aerial vehicle (UAV), such as the UAV 130*a* (FIG. 1) that is suitable for use with various embodiments. With reference to FIGS. 1-2, the UAV 130*a* may be a quadcopter-type craft having a body 200 (i.e., fuselage, frame, etc.) that may be made out of any combination of plastic, metal, or other materials suitable for flight. The body 200 may include one or more processors 230 (or computing device) that is configured to monitor and control the various functionalities, subsystems, and/or other components of the UAV 130*a*. For example, the processor 230 may be configured to monitor and control various functionalities of the UAV 130*a*, such as any combination of modules, software, instructions, circuitry, hardware, etc. related to propulsion, navigation, power management, exception-detection/handling, sensor management, and/or stability management.

The processor 230 may include one or more processing unit(s) 201, such as one or more processors configured to execute processor-executable instructions (e.g., applications, routines, scripts, instruction sets, etc.), a memory and/or storage unit 202 configured to store data (e.g., flight plans, obtained sensor data, received messages, applications, etc.), and one or more wireless transceiver(s) 204 and antenna(s) 206 for transmitting and receiving wireless signals (e.g., a Wi-Fi® radio and antenna, Bluetooth®, RF, etc.). In some embodiments, the UAV 130*a* may also include components for communicating via various wide area networks, such as cellular network transceivers or chips and associated antenna (not shown).

The processor 230 of the UAV 130*a* may further include various input units 208 for receiving data from human operators and/or for collecting data indicating various conditions relevant to the UAV 130*a*. For example, the input units 208 may include camera(s), microphone(s), location information functionalities (e.g., a global positioning system (GPS) receiver/antenna for receiving GPS signals), flight instruments (e.g., attitude indicator(s), gyroscope(s), accelerometer(s), altimeter(s), compass(es), etc.), keypad(s), etc. In some embodiments, various parameters of sensors included within the input units 208 may be configurable. For example, the processor 230 may configure various settings or parameters controlling how a camera onboard the UAV 130*a* obtains sensor data, such as a shutter speed setting, a focus setting, and/or a zoom setting. Further, the physical position and/or orientation of sensors may be adjustable in some embodiments. For example, the UAV 130*a* may be capable of configuring the rotation or gimbal settings of an attached camera by controlling various motors, actuators, and/or other mechanisms for adjusting the camera. In this manner, sensors may be directed for providing different sensor data (e.g., a camera may be pointed downwards during landing procedures).

The processor 230 may utilize various modules (e.g., software, circuitry, units, components, routines, etc.) to enable functionalities of the UAV 130*a*, such as an image-processing module 212 for executing vision algorithms, an exception-handling module 214 (or exception detection and handling module), a navigation module 216, a position control module 218 for providing control signals to various mechanical components of the UAV 130*a*, and a coordinate transformation module 219 to transform coordinates derived from sensor data (e.g., coordinates or positions based on analysis of camera imagery) into other coordinates (e.g., UAV body coordinates, global coordinates). The various components of the processor 230 may be connected via a bus 210 or other similar circuitry.

Figure 3A:
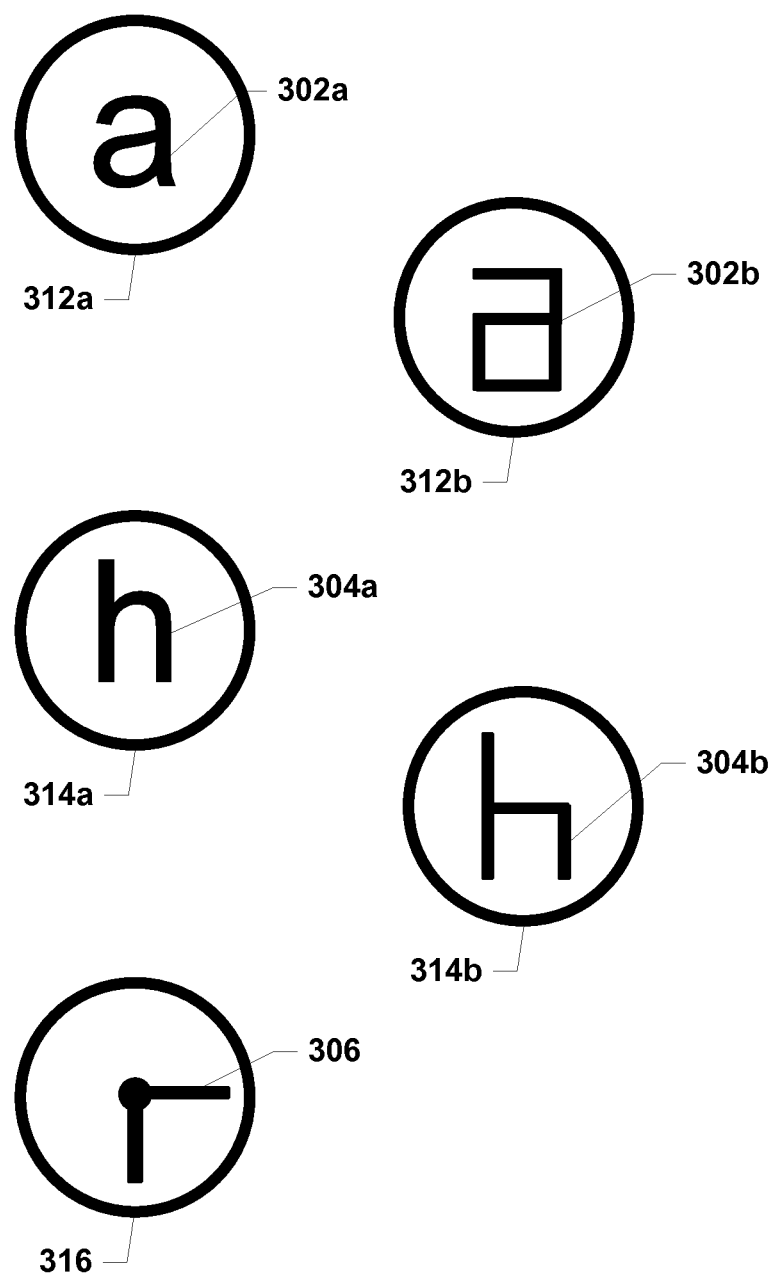
FIG. 3A is a diagram illustrating exemplary landing patterns that may be suitable for use in various embodiments.

In some embodiments, the image-processing module 212 may be configured with various routines (or other modules) for performing computer vision algorithms, such as an algorithm that includes operations for any or all of preprocessing images (e.g., removing noise, equalizing, enhancing, performing binarization, etc.), finding contours within images, estimating distances between the UAV 130*a* and elements depicted in imagery, detecting predefined shapes or symbols (e.g., circles, ellipse, symbols such as shown in FIG. 3A, etc.), identifying available or open landing bays, estimating differences between the UAV's orientation and position and a landing bay based on imagery, and/or the like.

The body 200 may include landing gear 220 of various designs and purposes, such as legs, skis, wheels, pontoons, etc. The body 200 may include a power source 221 that may be coupled to and configured to power the motors 222 and various other components of the UAV 130*a*. For example, the power source 221 may be a rechargeable battery for providing power to operate the motors 222 and/or the units of the processor 230.

The UAV 130*a* may be of a rotorcraft design that utilizes one or more rotors 224 driven by corresponding motors 222 to provide lift-off (or takeoff) as well as other aerial movements (e.g., forward progression, ascension, descending, lateral movements, tilting, rotating, etc.). The UAV 130*a* may utilize various motors 222 and corresponding rotors 224 for lifting off and providing aerial propulsion. For example, the UAV 130*a* may be a "quadcopter" that is equipped with four motors 222 and corresponding rotors 224.

The motors 222 may be coupled to the processor 230 and thus may be configured to receive operating instructions or signals from the processor 230. For example, the motors 222 may be configured to change rotation speed of corresponding rotors 224, etc. based on instructions received from the processor 230. The motors 222 may be independently controlled by the processor 230 such that some rotors 224 may be engaged at different speeds, using different amounts of power, and/or providing different levels of output for moving the UAV 130*a*. For example, motors 222 on one side of the body 200 may be configured to cause corresponding rotors 224 to spin at a higher rotations per minute (RPM) than rotors 224 on the opposite side of the body 200 in order to balance the UAV 130*a*.

For high precision landing, UAVs according to various embodiments may perform operations to search for (or identify) special visual patterns that are designed for robust and efficient detection by a combination of basic or standard computer vision functions applied to imagery captured by on-board camera sensors. Such special landing patterns may be predefined and configured in order to provide information on the direction, position, and orientation of landing bays and be detectable from any viewing angle. For example, a landing pattern may be an asymmetric symbol within a circle that indicates a global orientation such that each hemisphere of the asymmetric symbol is different from an opposite hemisphere of the asymmetric symbol. As another example, a landing pattern may be an asymmetrical alphanumeric character within a circle.

The UAV may use such landing patterns to calculate an orientation based on a comparison of a current heading of the UAV to the global orientation of the asymmetric symbol. For example, a landing pattern displayed in a target landing bay may be a pattern that provides a global orientation of the target landing bay, and thus provides an indication to a UAV regarding how to properly orient the vehicle in order to precisely land in the target landing bay without impeding landing for adjacent landing bays. In some embodiments, the landing patterns rendered or otherwise displayed within landing bays of a multi-bay landing zone may be static (e.g., painted on a surface, etc.) and/or dynamic (e.g., temporarily rendered via a landing device or the like.).

FIG. 3A illustrates a non-limiting, exemplary set of landing patterns 312a-316 that may be suitable for use in various embodiments. With reference to FIGS. 1-3A, each of the landing patterns 312a-316 may include at least a circle circumscribing a special, asymmetric symbol configured to provide a global orientation. For example, possible landing patterns that may be statically or dynamically represented within landing bays of a multi-bay landing zone may each include a circle as well as any of a first symbol 302a that depicts a lowercase letter 'a', a second symbol 302b that depicts an angular lowercase letter 'a', a third symbol 304a that depicts a lowercase letter 'h', a fourth symbol 304b that depicts an angular lowercase letter 'h', and a fifth symbol 306 that depicts another asymmetrical angular pattern. Each of the landing patterns 312a-316 may be asymmetrical such that a UAV (e.g., 130a) processing imagery of any of the landing patterns 312a-316 may identify an orientation and a center point.

Figure 3B:
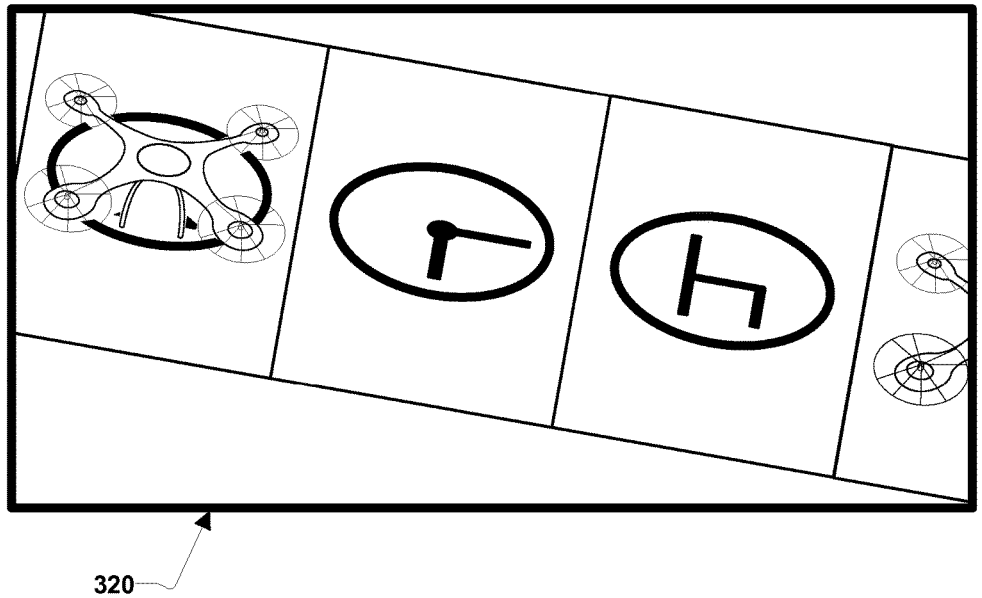
FIG. 3B is a diagram illustrating exemplary imagery including representations of landing bays within a multi-bay landing zone suitable for use in various embodiments.

As described herein, in some embodiments a UAV may continually perform image-processing in order to identify a multi-bay landing zone, landing bays within the landing zone, and/or other UAVs. In particular, in some embodiments, the UAV may capture images with one or more camera sensors and evaluate each captured image to identify the center and other characteristics of a landing pattern of a landing bay necessary for orienting the UAV for a precise and safe landing in the landing bay. FIG. 3B illustrates exemplary imagery 320 of a multi-bay landing zone as captured by a UAV according to some embodiments. The imagery 320 may be a digital image of a section of the multi-bay landing zone located in front of and/or below the UAV at the time the imagery 320 was captured. For example, when the on-board camera of the UAV is pointed forward, the imagery 320 may represent one or more landing bays that are positioned in front of the UAV.

Figure 3C:
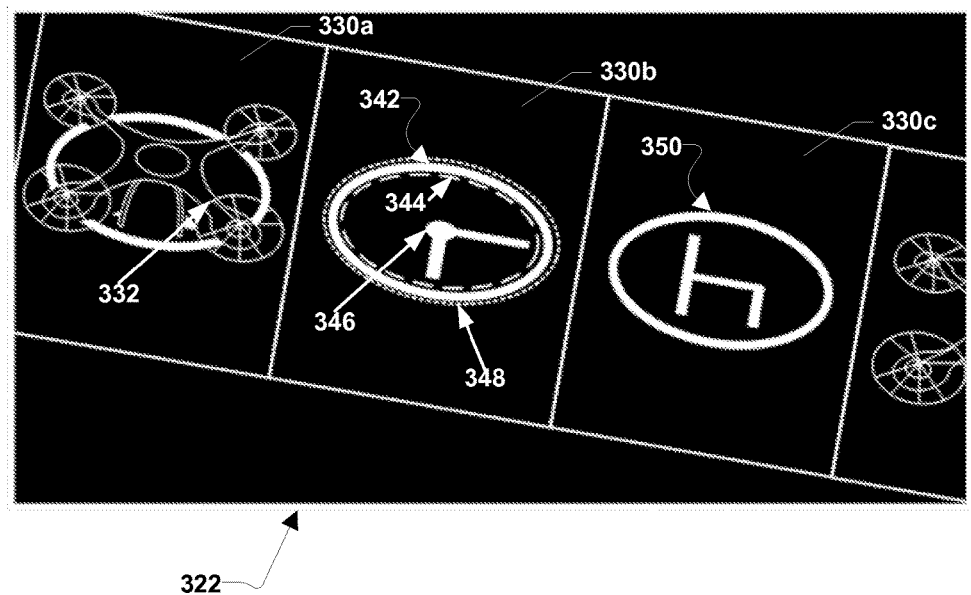
FIG. 3C is a diagram illustrating exemplary processed imagery suitable for use in various embodiments.

In order to identify useful information from the captured imagery 320, various processing operations may be performed by the UAV. FIG. 3C illustrates exemplary processed imagery 322 based on the exemplary imagery 320 of FIG. 3B. With reference to FIGS. 1-3C, the UAV may identify various elements within the processed imagery 322, including the representations of a plurality of landing bays 330a-330c. The UAV may further identify representations of another UAV 332 (e.g., 130b) occupying the first landing bay 330a, a first landing pattern 342 in the second landing bay 330b, and a second landing pattern 350 in the third landing bay 330c. When the first landing pattern 342 is determined to indicate a landing bay that is assigned to the UAV or otherwise available for landing, the UAV may further identify an outer circle 348, an inner circle 344, and a center point 346 of the first landing pattern 342. Based on these identified elements, the UAV may calculate an orientation and center position of the second landing bay 330b suitable for use in landing the UAV.

The following is an example of a vision algorithm that may be performed by a processor of a UAV (e.g., 130a) when processing imagery (e.g., shown in FIGS. 3B-3C). In response to capturing imagery 320 of a multi-bay landing zone via an on-board camera, the UAV may perform pre-processing operations, such as blurring to remove background noise and small features from the captured imagery 320, (adaptive local) histogram equalization, contrast enhancement, and binarization. The pre-processing operations may generate processed imagery 322. The UAV may perform operations for finding contours in the processed imagery 322, and the UAV may detect circles and/or ellipses within the found contours. As circles may be viewed as ellipses from a perspective, ellipse fitting operations may be performed to improve the algorithm's robustness. For example, for all the found contours, the UAV may use ellipse fitting routines to determine how close each contour matches a circle or ellipse. The UAV may compare the contour area and calculated area for a fitted ellipse in order to determine whether the areas are similar, as only a real ellipse or circle may have a very close match.

The UAV may identify any circles (or ellipses) that include special symbols (i.e., likely landing patterns). For example, using standard contour algorithms, each circle in the processed imagery 322 may show multiple concentric circular contours due to bold paint/print or lighting conditions. For example, the imagery 322 may include the outer circle 348 and the inner circle 344. Based on such a contour hierarchy, the UAV may identify innermost circles (or ellipses) as boundaries of landing patterns, such as the inner circle 344.

The UAV may use a pre-provided range on the area ratio of an internal contour area to the landing pattern area in order to determine whether the identified innermost circles (or ellipses) are valid. The algorithm may reject the empty landing patterns or the ones with too small features as candidate locations.

The UAV may then identify symbols (or markers) within the identified landing patterns, such as an asymmetric symbol (e.g., as illustrated in FIG. 3A). The UAV may further process the symbol imagery inside each of the landing patterns to determine whether the symbol imagery depicts an available landing pattern (e.g., assigned, open, etc.). For example, the UAV may apply a mask to the imagery 322 and determine whether the contours inside the landing pattern correspond to an open or assigned landing pattern that the UAV may track to for landing. Given a pre-defined pattern or symbol of a valid target landing bay, the UAV may determine whether symbol imagery inside a landing pattern has the appropriate geometry relations, angles, dimensions, ratios, etc., enabling the UAV to identify only valid landing bays that satisfy such qualities.

When a plurality of valid landing bays are detected within the imagery 322, the UAV may perform operations for selecting a target landing bay among the plurality of valid landing bays. For example, when multiple landing bays are in view (i.e., depicted within current camera imagery 322), the UAV may select one of the multiple bays as a target landing bay. Such a selection may be based on various criteria, such as the distance from the plurality of landing bays to the UAV body and/or the landing pattern depicted in the imagery 322 corresponding to the various landing bays. For example, the UAV may select a target landing bay as the closest landing bay that includes a landing pattern predefined to indicate availability (i.e., an "open" landing bay).

The UAV may calculate the position and orientation of the selected target landing bay based on the imagery 322 and may determine movement instructions for moving the UAV toward the target landing bay. In the process of moving closer to the target landing bay, other landing bays may become available for landing. However, the UAV may not typically switch to such a new target landing bay under these conditions, as this may increase the probability of causing a collision with other UAVs and/or greatly reduce predictability within the landing zone. The UAV may track the selected landing bay within subsequently captured imagery. When the target landing bay is missing for a few image frames in the process of moving to the selected target landing bay, the UAV may utilize a tracking mechanism to provide more stable input to the UAV control.

Once the UAV determines that the UAV has arrived at the target landing bay based on the captured imagery 322, the UAV may generate a directional vector for landing on the target landing bay surface. For example, with image-processing, the UAV may identify an orientation vector for landing along a desired axis of the target landing bay. To generate such a vector, the UAV may transform "camera coordinates" of the target landing bay into the coordinates associated with the UAV body.

Figure 4:
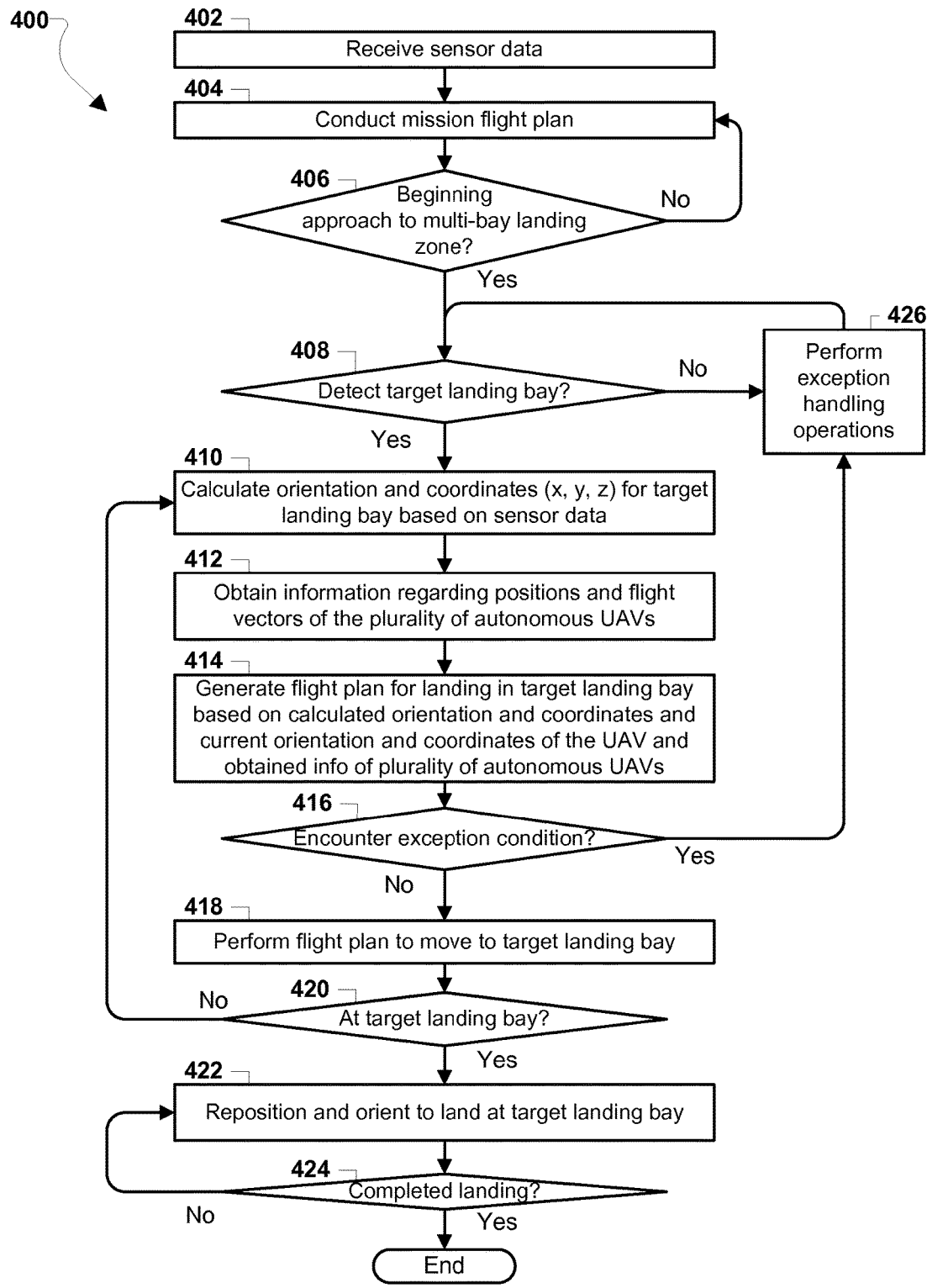
FIG. 4 is a process flow diagram illustrating a method performed by a processor of an autonomous UAV for safely controlling landing in a landing zone including a plurality of landing bays while flying among a plurality of autonomous UAVs according to various embodiments.

FIG. 4 illustrates a method 400 according to various embodiments that may be performed by a processor of an autonomous UAV (e.g., one or more of the UAVS 130a-130c in FIGS. 1-2) for safely controlling landing in a landing zone including a plurality of landing bays (or a "multi-bay landing zone") while flying among a plurality of autonomous UAVs. With reference to FIGS. 1-4, the method 400 may be performed by a processor of a computing device (e.g., the processor 230 utilizing one or more of the modules 212-219) of the UAV 130a.

The method 400 may be an implementation of an autonomous landing routine that may use a vision algorithm such as described. With such an autonomous landing routine, a UAV may incorporate vision processing functionalities with various other functionalities or components, such as an exception-detection/exception-handling module, a remote-piloting support/override functionality, a position control module, and/or a missed-approach functionality (e.g., predefined instructions for re-positioning, circling, etc.). In various embodiments, the UAV may perform operations of the method 400 in an iterative manner, such as by tracking imagery elements over time and gradually adjusting a flight plan for precise positioning over top of a target landing bay.

In block 402, the processor of the UAV may receive sensor data, such as continuous real-time sensor data, from various components on board the UAV and/or originating remotely from the UAV (e.g., from the server 150, other UAVs, etc.). The continuous real-time sensor data may include imagery, sounds, wireless communications, motion sensor data, GPS signals, and/or other data obtained via instruments and functionalities of the UAV that indicate various local operating and environmental conditions. For example, the UAV may continually poll components to obtain information about immediate or upcoming surroundings while conducting a flight, such as location data received from a global positioning system (GPS) receiver, image data from a camera, audio data from a microphone, movement data from an accelerometer, orientation data from a gyroscope, and signaling data from the transceiver (e.g., incoming messages from a wireless local area network, peer-to-peer messaging, etc.). In some embodiments, the reception of the continuous real-time sensor data may be performed at regular intervals, such as every millisecond, second, etc. and/or on demand, such as in response to incoming wireless messages from other UAVs. Although the receiving operations are shown in relation to block 402, the UAV may continually obtain sensor data, messages, and/or other data regarding the operating conditions, environment, and exception conditions relevant to the UAV throughout the performance of the method 400.

In block 404, the processor of the UAV may conduct a mission flight plan. The mission flight plan may be a set of instructions provided to the UAV by an operator, server, or other source that indicate various actions and/or commands for the UAV to perform a task. For example, the mission flight plan may include a series of commands and coordinates for the UAV to travel to a destination, drop a payload, and return to the landing zone. In some embodiments, the UAV may utilize a navigation module 216 and/or a position control module 218 when performing the operations of block 404.

In determination block 406, the processor of the UAV may determine whether the UAV is beginning an approach to the multi-bay landing zone based on the continuous real-time sensor data. In other words, the UAV may continually evaluate the continuous real-time sensor data to determine whether the UAV is within proximity of the landing zone and thus should begin executing an autonomous landing procedure. In some embodiments, the UAV may compare current coordinates of the UAV from the continuous real-time sensor data to coordinates for the landing zone and/or detect imagery of the landing zone within camera imagery from the continuous real-time sensor data. For example, when on a return leg of a mission flight plan and within a geofence associated with the landing zone, the UAV may begin a landing approach. In some embodiments, the determination may be made based on image analysis of camera data, such as detecting imagery corresponding to the landing zone, GPS data (or other real-time location data) corresponding to the known location of the landing zone, and/or the reception of beacon signals from beacon devices within the landing zone.

In response to determining that the UAV is not beginning the approach to the multi-bay landing zone (i.e., determination block 406="No"), the UAV may continue to conduct the mission flight plan in block 404.

In response to determining that the UAV is beginning the approach to the multi-bay landing zone (i.e., determination block 406="Yes"), the processor of the UAV may determine whether a target landing bay is detected within the multi-bay landing zone based on the continuous real-time sensor data in determination block 408. For example, the UAV may perform a vision algorithm, such as described to detect an open landing bay within camera imagery. In some embodiments, the UAV may utilize an image-processing module 212 when performing the operations of determination blocks 406-408.

In some embodiments, UAVs may be programmed or otherwise assigned to particular target landing bays within the multi-bay landing zone. For example, a first UAV may be assigned to a first landing bay, a second UAV may be assigned to a second landing bay, etc. In such a case, the UAV may detect an assigned landing bay as the target landing bay. In some embodiments, target landing bays may be assigned before and/or in response to performing a mission flight plan, before and/or in response to approaching a multi-bay landing zone.

However, in some scenarios, due to emergency landings or an "open reservation policy" of the multi-bay landing zone (e.g., first-come, first-server), UAVs may be required to perform searching for open/available landing bays in order to land after a mission has been completed. In such cases (e.g., when there is no assigned landing bay associated with the UAV), the detection operations may include selecting one of a plurality of landing bays depicted within the continuous real-time sensor data.

In some embodiments, the UAV may select only one available landing bay as a target landing bay based on certain criteria, such as the available landing bay being determined to be closest to the UAV based on the image analysis. Once a target landing bay is selected, a tracking mechanism or routine may be executed by the UAV processor to maintain focus on that selected target landing bay, as any unnecessary deviation may cause problems for efficiency and safety, especially with regard to confusing or colliding with other UAVs in the landing zone.

In some embodiments, the UAV may perform operations to check-out or otherwise reserve a landing bay. For example, when determining that an assigned landing bay is occupied by another UAV, the UAV may identify another landing bay for landing and may transmit a wireless communication to a server indicating that the new landing bay is now to be occupied by the UAV. In some embodiments, the UAV may identify a target landing bay based on suggestions or instructions from the server. For example, upon beginning a landing approach, the UAV may transmit a reservation request message to the server and in response may receive the identity (e.g., spot number, relative position within the landing zone, etc.) of the target landing bay for the UAV.

In response to determining that the target landing bay is not detected within the multi-bay landing zone based on the continuous real-time sensor data (i.e., determination block 408="No"), the UAV may perform exception-handling operations in block 426 (e.g., as described with reference to FIG. 7) and continue with the determination operations in determination block 408. For example, the UAV may perform operations for detecting an alternative target landing bay that is available for landing based on the continuous real-time sensor data, calculate an alternative orientation and alternative position coordinates for landing in the alternative target landing bay, and adjust a flight plan for landing in the alternative target landing bay based on the alternative orientation, the alternative position coordinates, and the current orientation and position of the UAV.

In response to determining that the target landing bay is detected within the multi-bay landing zone based on the continuous real-time sensor data (i.e., determination block 408="Yes"), the processor of the UAV may calculate an orientation and position coordinates (e.g., x-axis, y-axis, z-axis coordinates, GPS data, etc.) for the target landing bay based on the continuous real-time sensor data in block 410. For example, the UAV may calculate the orientation based on a comparison of a current heading of the UAV to the global orientation of an asymmetric symbol in the imagery of the landing pattern of the target landing bay. In some embodiments, using the vision algorithm described (e.g., with reference to FIGS. 3A-3C), the UAV may analyze camera imagery to detect an innermost circle of a landing pattern of the target landing bay, calculate a center point based on the innermost circle, and identify an orientation of the landing pattern based on an included asymmetrical symbol (e.g., 'a', 'h', etc.). In some embodiments, the UAV may perform the vision algorithm to produce a directional vector for the UAV to fly to the target landing bay as well as an orientation vector for the UAV to land along a desired axis at the target landing bay. Such vectors may be transformed from camera coordinates into the local coordinates of the UAV. In such calculations, the UAV may utilize basic configuration parameters (e.g., such as which camera was used to capture the imagery used, the angle between the camera mount relative to the body of the UAV, etc.) when automatically calculating the coordinate transformation.

Figure 5:
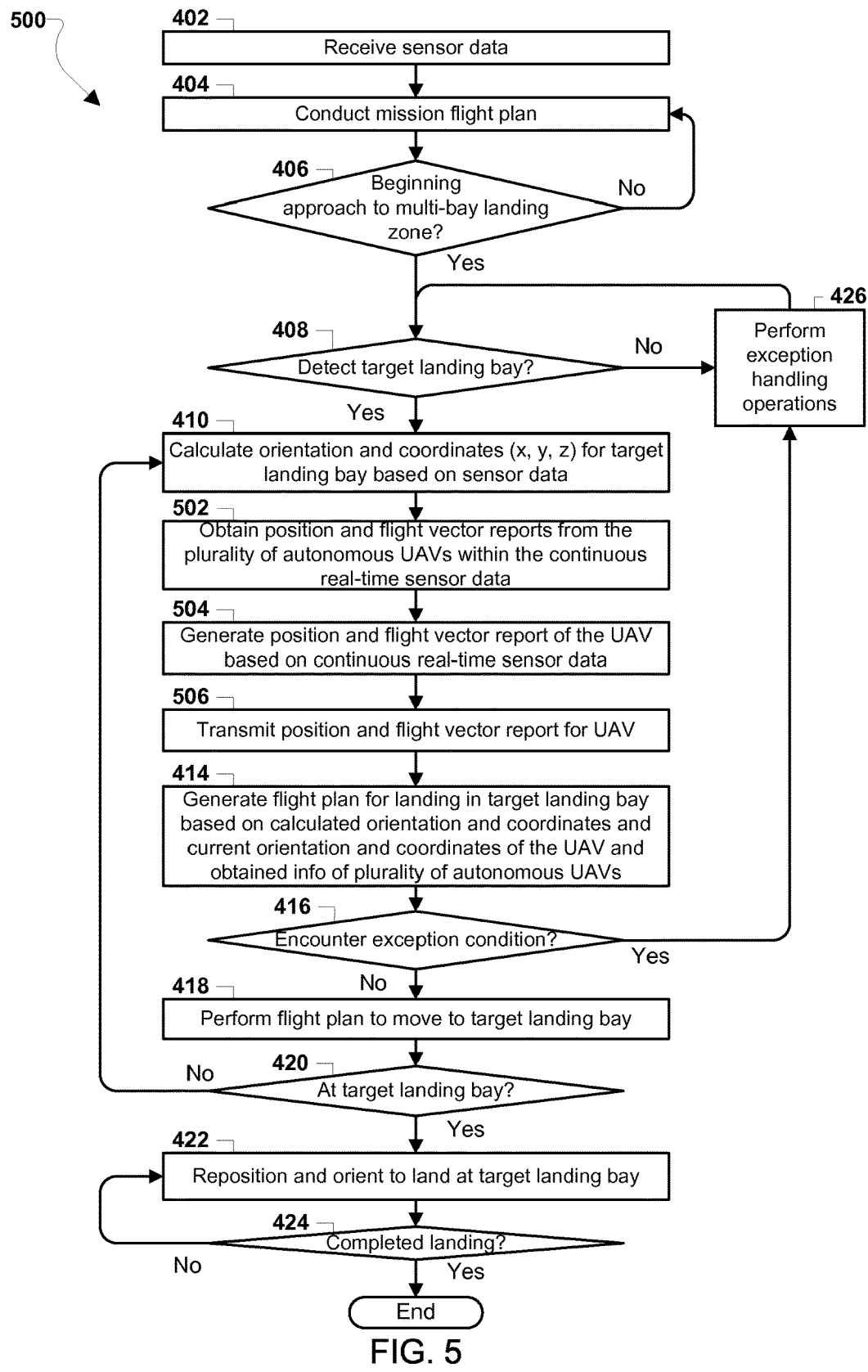
FIG. 5 is a process flow diagram illustrating a method performed by a processor of an autonomous UAV for exchanging wireless messaging with other UAVs in a plurality of autonomous UAVs in order to identify positions/flight vectors to safely control landing in a landing zone including a plurality of landing bays according to various embodiments.

In block 412, the processor of the UAV may obtain information regarding positions and flight vectors of the plurality of autonomous UAVs, which are at or near the multi-bay landing zone. In some embodiments, the UAV may obtain the information based on image analysis, such as by tracking the position of other UAVs within a sequence of images to identify flight vectors, headings, current/future position, speed, etc. For example, using a high-speed camera, the UAV may capture a set of photos that depict another UAV moving in front of the UAV, evaluate the set of photos to identify the amount of movement by the other UAV to identify a trajectory, speed, etc. of the other UAV. In such a case, the UAV may factor in the UAV's speed, orientation, and position when calculating the other UAVs' movement attributes. FIG. 5 illustrates additional operations for obtaining information about other UAV positions and flight vectors.

Returning to FIGS. 1-4, in block 414, the processor of the UAV may generate a flight plan for landing in the target landing bay based on (but not limited to) the calculated orientation and coordinates, the current orientation and coordinates of the UAV, the obtained information of the plurality of autonomous UAVs, or any combination thereof. In other words, the UAV may generate a sequence of instructions to be performed over a period of time to move the UAV to the target landing bay without colliding with other UAVs, obstacles of the multi-bay landing zone, and/or other obstructions. For example, the flight plan may be a set of flight maneuvers that the UAV executes to cause the UAV to rise in elevation a certain amount, move in a first direction for a period of time at a first speed, and move in a second direction for a second period of time at a second speed. The UAV processor may generate the flight plan by comparing the target landing bay coordinates and orientation to the current UAV orientation and coordinates to determine the most efficient sequence of operations to position the UAV above the target landing bay for a simple descending landing maneuver. In some embodiments, the UAV may utilize a navigation module 216 when performing the operations of block 414.

In determination block 416, the processor of the UAV may determine whether the UAV has encountered or is likely to encounter an exception condition (non-limiting examples of which are described with reference to FIG. 7) based on the continuous real-time sensor data. For example, the UAV may determine based on the obtained information about the positions and flight vectors of the other UAVs within the landing zone that an automated flight plan is too risky, and thus a remote pilot should control the UAV for a period.

In response to determining that the UAV has encountered an exception condition (i.e., determination block 416="Yes"), the processor of the UAV may perform the exception handling operations in block 426. In some embodiments, the UAV may utilize an exception-handling module 214 when performing the operations of blocks 416, 426.

In response to determining that the UAV has not encountered an exception condition (i.e., determination block 416="No"), the processor of the UAV may perform the flight plan to move to the target landing bay in block 418. For example, the UAV may perform operations to control on-board motors to cause the UAV to move in a direction toward the target landing bay at a certain speed. In some embodiments, the UAV may utilize a navigation module 216 and/or a position control module 218 when performing the operations of determination block 418.

In determination block 420, the processor of the UAV may determine whether the UAV is located (or has arrived) at the target landing bay. The UAV may use any combination of the various embodiments to determine whether the UAV is located at (e.g., above) the target landing bay. For example, based on an analysis of imagery obtained of the area directly below the UAV, the UAV may determine whether the UAV is centered above the landing pattern of the target landing bay (e.g., aligned with reference to the width and depth of a surface of the target landing bay, etc.). As another example, the UAV may determine whether there are unperformed operations in the flight plan, thus indicating that the UAV is or is not at the target landing bay. As another example, the UAV may compare position data from position location systems (e.g., GPS, assisted GPS, etc.) with predetermined location coordinates of the target landing bay. As another example, the UAV may analyze signal strength from nearby devices (e.g., the target landing bay device) to estimate distances from the devices and/or known coordinates of the devices. In some embodiments, distance measurements or proximity detections may be conducted by landing bay devices, such as the target landing bay's landing bay device. For example, the landing bay device may take measurements of signals received from the UAV and/or other sensor data (e.g., camera imagery) to determine how close and/or whether the UAV is properly aligned with the target landing bay. The landing bay device may report such data to the UAV via wireless transmissions. Thus, the UAV may determine whether the UAV is located at the target landing bay using various techniques.

In some embodiments, the UAV may determine that the UAV is located at the target landing bay (i.e., determination block 420="Yes") when the UAV is determined to be within a threshold distance of the target landing bay based on the above techniques. In other words, the UAV may not have to be directly above (or centered over) the target landing bay device to be considered located at the target landing bay. In some embodiments, the UAV may adjust a camera in order to obtain sensor data suitable for the determinations of determination block 420. For example, to obtain camera imagery of the area (e.g., the target landing bay) directly below or in front of the UAV, the UAV may cause an actuator to rotate a camera downwards for taking pictures directly below the UAV. In some embodiments, the UAV may utilize an image-processing module 212 and/or a coordinate transformation module 219 when performing the operations of determination block 420.

In response to determining that the UAV is not at the target landing bay (i.e., determination block 420="No"), the UAV may continue with the calculation operations in block 410. In this way, the UAV may iteratively update and adjust the flight plan for traveling to the target landing bay, accounting for unforeseen exception conditions along the path.

In response to determining that the UAV is at the target landing bay (i.e., determination block 420="Yes"), the processor of the UAV may reposition and orient the UAV to land (or "touchdown") at the target landing bay in block 422. For example, the UAV may descend based on a control of rotor motors and continually evaluate camera imagery to identify whether the UAV is still centered on the landing pattern and/or oriented corresponding to the special symbol of the landing pattern. When the UAV determines a deviation compared to the landing pattern and the current orientation and position of the UAV, the UAV may make corrections, such as by increasing or decreasing power to certain rotor motors, moving ballast, temporarily halting a descent in order to move laterally, etc.

In various embodiments, the UAV may or may not be configured to obtain camera imagery directly below the UAV during landing. In some embodiments in which no camera imagery is available directly above the target landing bay, the UAV may utilize alternative methods for detecting whether there are positional deviations that may require repositioning and/or reorienting of the UAV. For example, once the UAV is positioned over and in alignment with a landing pattern for the target landing bay, the UAV may continually analyze camera imagery of other objects within the landing zone to determine whether the descent is precise (e.g., posts in front of the UAV, landing patterns placed on walls adjacent to or in front of the target landing bay, etc.). As another example, if the camera of the UAV is facing slightly downward (e.g., 30-45 degrees from horizontal plane through the UAV), the UAV may be unable to directly image the landing pattern. Instead, the camera imagery may image the landing pattern offset from the center (e.g., the landing pattern may be present in the imagery but skewed due to the camera angle). To compensate for such imaging issues, the UAV may analyze the camera imagery and calculate an offset that may be used to determine whether the UAV is centered or otherwise properly oriented with relation to the landing pattern regardless of the skewed imagery of the landing pattern in the camera imagery.

In some embodiments, the processor of the UAV may utilize a coordinate transformation module (e.g., module 219) to transform the target landing bay coordinates from camera coordinates to UAV body coordinates, and to global coordinates that can be compared to coordinates of the target landing bay in the physical world. In some embodiments, a set point controller may be applied and/or accurate ground or level-sensing, calibration between three frames of references, and calibration on the camera.

In determination block 424, the processor of the UAV may determine whether the UAV has landed (i.e., touched-down or not). In some embodiments, whether the UAV has landed in determination block 424 may include gauging the precision or accuracy of the landing of the UAV. For example, the UAV may obtain and analyze sensor data (e.g., camera imagery below the UAV, etc.) to take measurements and determine whether the UAV landed in the appropriate (e.g., assigned) target landing bay within an acceptable margin of error (e.g., centered and oriented within an acceptable, predetermined range of positions and orientations for a particular assigned landing bay, etc.). In this manner, the UAV may perform operations that confirm that the UAV landed in the right place. In response to determining that the UAV has not completed the landing appropriately (i.e., determination block 424="No"), the processor of the UAV may continue with the reposition and orienting operations in block 422. Thus, the UAV may iteratively perform a descent onto the target landing bay, adjusting position and orientation until the UAV lands in a precise manner. In some embodiments, the UAV may utilize an image-processing module 212 and/or a coordinate transformation module 219 when performing the operations of blocks 422-424.

In response to determining that the UAV has completed the landing (i.e., determination block 424="Yes"), the method 400 may end. In some embodiments, in response to detecting that the UAV did not land within a predetermined margin of error or precision, the UAV may perform a lift-off and continue with the operations in block 422 until a satisfactory landing is completed in an appropriate landing bay.

FIG. 5 illustrates a method 500 performed by a processor of an autonomous UAV (e.g., one or more of the UAVS 130a-130C in FIGS. 1-2) for exchanging wireless messaging with other UAVs in a plurality of autonomous UAVs in order to identify positions and/or flight vectors to safely control landing in a landing zone including a plurality of landing bays according to various embodiments. With reference to FIGS. 1-5, the method 500 may be performed by a processor of a computing device, such as the processor 230 (e.g., utilizing one or more of the modules 212-219) of the UAV 130a.

The operations of the method 500 may be similar to operations of the method 400, except the method 500 may include explicit operations for the UAV to obtain information about other UAVs via device-to-device signaling, such as via Bluetooth® signaling between nearby UAVs. For example, the UAV may continually receive position and flight vector reports from any UAVs within transmission range, and further may continuously transmit reports of the UAV's own position and flight vector for use by the other UAVs in exception detection and handling operations. In the method 500, the operations of blocks 402-410, 414-426 may be similar to the operations of like numbered blocks of the method 400 as described.

In block 502, the processor of the UAV may obtain position and flight vector reports from the continuous real-time sensor data, wherein the reports may be from a plurality of autonomous UAVs. In other words, the flight vectors and other characteristics or operating parameters of other UAVs may be obtained directly from the other UAVs. For example, via an on-board transceiver, the UAV may receive wireless communications indicating vectors, locations, headings, etc. from any nearby UAVs that are also landing, taking-off, flying, or otherwise operating within the multi-bay landing zone. In some embodiments, the UAV may receive reports of the plurality of UAVs from an indirect source, such as beacon devices within the landing zone and/or a remote server configured to relay such reports and/or one or more of the UAVs reporting on the behalf of other UAVs.

The UAV may broadcast position, flight vector, and other operating conditions for use by other UAVs and/or other devices (e.g., servers, etc.). Accordingly, in block 504, the processor of the UAV may generate a position and flight vector report of the UAV based on the continuous real-time sensor data, and may transmit the position and flight vector report for the UAV for receipt by nearby UAVs (and/or other devices) in block 506. The UAV may continue executing the operations in block 414 as described.

Figure 6:
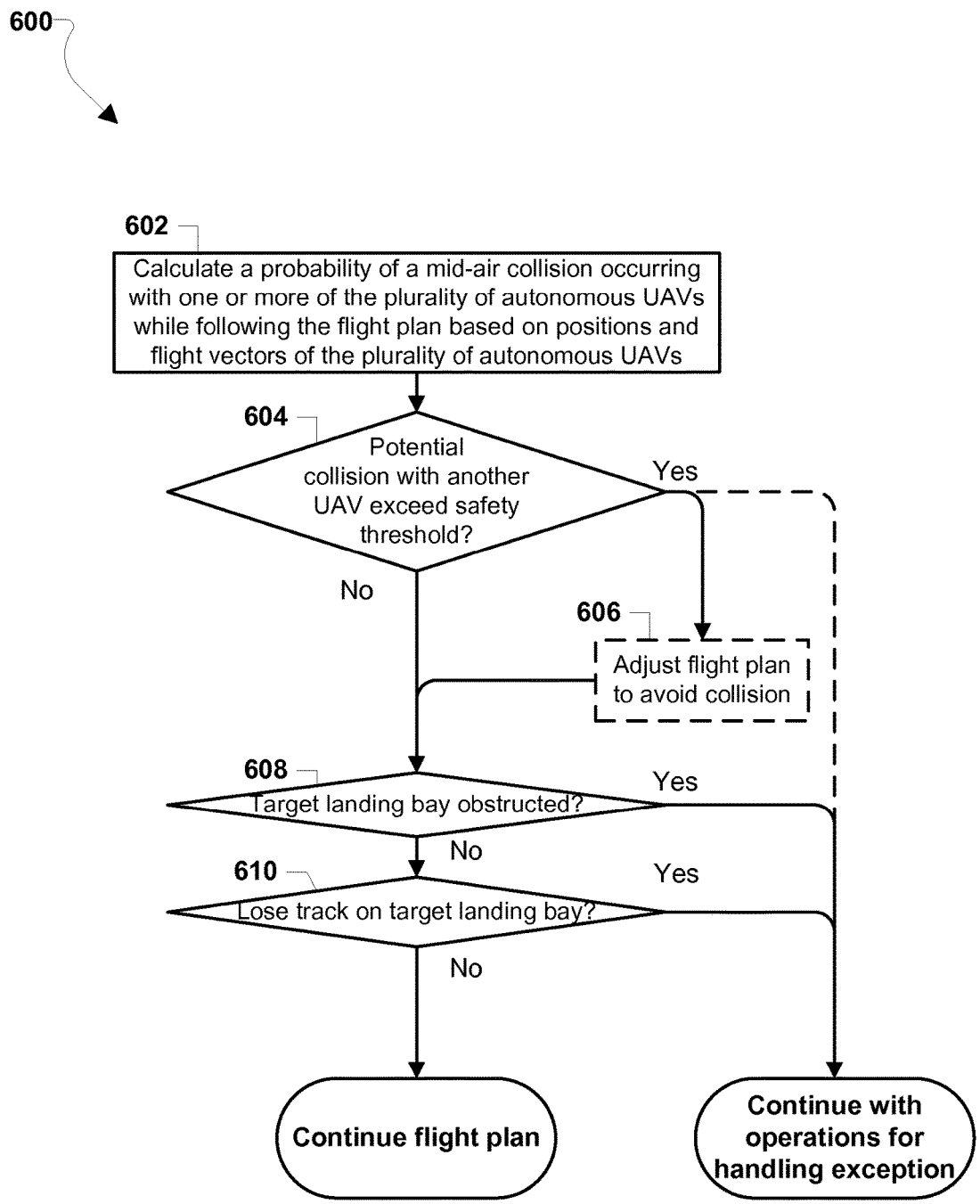
FIG. 6 is a process flow diagram illustrating a method performed by a processor of an autonomous UAV for determining whether exception conditions are encountered while landing in a landing zone including a plurality of landing bays among a plurality of autonomous UAVs according to various embodiments.

FIG. 6 illustrates a method 600 performed by a processor of an autonomous UAV for determining whether exception conditions are encountered while landing in a multi-bay landing zone including a plurality of landing bays among a plurality of autonomous UAVs according to various embodiments. With reference to FIGS. 1-6, the exception-determination operations of the method 600 may be performed during the performance of a flight plan for landing within the landing zone, such as in response to executing the operations of block 414 and in place of the operations of determination block 416 of the method 400 as described. For example, the UAV may continue to evaluate sensor data to determine whether the UAV is experiencing or about to experience a flight condition that may render the autonomous landing procedure (or landing flight plan) impossible, impractical, and/or otherwise in need of revision to ensure a safe landing. In various embodiments, the method 600 may be performed by a processor of a computing device, such as the processor 230 of the UAV 130a, and may utilize various modules 212-219.

In block 602, the processor of the UAV may calculate a probability of a mid-air collision occurring with one or more of the plurality of autonomous UAVs while following the flight plan based on positions and flight vectors of the plurality of autonomous UAVs. As described with reference to the operations of block 412 of the method 400 and/or block 502 of the method 500, the processor of the UAV may continuously monitor positions and flight vectors of the plurality of autonomous UAVs while performing the flight plan for landing in the target landing bay based on the continuous real-time sensor data. For example, based on camera imagery and/or received reports (directly or indirectly) from nearby UAVs, the UAV may track how and where other UAVs are moving within the landing zone. The UAV may compare projections of the movements and destinations of the other UAVs the flight plan of the UAV to calculate the probability of mid-air collision. For example, in response to determining there is a projected overlap in airspace and time for the UAV and an oncoming other UAV, the UAV may calculate a high probability that a mid-air collision may occur if the UAV's flight plan to the target landing bay is not adjusted.

In determination block 604, the processor of the UAV may determine whether the calculated probability of a potential collision with another UAV exceeds a safety threshold. For example, the safety threshold may be a value provided to the UAV by a user and/or an operator of the landing zone via a server communication to the UAV or a direct input on the UAV, such as via a keypad, etc. Such safety threshold values may be provided to the UAV at various times, such as at a time of manufacture, at the start of (or deployment) for a flight mission, during a mission, etc. In some embodiments, the UAV may utilize one or more safety thresholds, such as a first safety threshold corresponding to various parameters, such as (but not limited to) a certain landing zone, a number of nearby UAVs, a UAV-type of the UAV or nearby UAVs, a type of mission associated with the UAV, type of cargo carried (or to be carried) by the UAV, weather or other environmental conditions, and/or other characteristics of the UAV, the operating parameters of the UAV, and/or the landing zone environment. For example, the UAV may use a high-tolerance safety threshold (e.g., a high calculated probability of a collision may exceed the threshold) when deployed in a landing zone with a low-density of other UAVs. As another example, the UAV may use a low-tolerance safety threshold (e.g., a low calculated probability of a collision may exceed the threshold) when deployed in a landing zone with a high-density of other UAVs.

In response to determining that the calculated probability for a collision with another UAV exceeds the safety threshold (i.e., determination block 604="Yes"), the processor of the UAV may adjust the flight plan, for instance, to avoid a potential collision in optional block 606. For example, the UAV may recalculate directions that may be used to move the UAV safely to the target landing bay in order to avoid a projected path of one or more UAVs. In some embodiments, the adjusted flight plan may include (but is not limited to) varied speeds, elevations, lateral movements, pauses, and/or other maneuvers to improve the safety of the UAV. In some embodiments, in response to determining that the calculated probability for a collision with another UAV exceeds the safety threshold (i.e., determination block 604="Yes"), the processor of the UAV may begin performing various exception-handling operations, such as described with reference to method 700 (FIG. 7). In some embodiments, the UAV may utilize a navigation module 216 when performing the operations of optional block 606.

In response to determining that the calculated probability for a collision with another UAV does not exceed the safety threshold (i.e., determination block 604="No"), or in response to adjusting the flight plan in optional block 606, the processor of the UAV may determine whether the target landing bay is obstructed in determination block 608. For example, the UAV may continually evaluate imagery of the target landing bay to identify whether objects have accidentally fallen on top of the target landing bay and/or other UAVs have landed in the target landing bay (e.g., without checking the landing bay out with a server, etc.), thus making a landing there unsafe or otherwise not possible for the UAV.

In response to determining that the target landing bay is not obstructed (i.e., determination block 608="No"), the processor of the UAV may determine whether the UAV has lost track of the target landing bay based on the continuous real-time sensor data in determination block 610. As described, in the process of moving closer to the target landing bay, the UAV may utilize a tracking mechanism to ensure the UAV maintains a course toward the selected target landing bay. For example, the UAV may analyze camera imagery or other sensor data to determine whether imagery of the target landing bay is included within the analyzed data (e.g., the target landing bay is missing or obscured for a few image frames, etc.). In some embodiments, the UAV may utilize an image-processing module 212 when performing the operations of determination blocks 608-610.

If tracking has been lost, the UAV may take actions to reacquire tracking to provide stable input to the control module. In response to determining that the UAV has not lost track on the target landing bay (i.e., determination block 610="No"), the processor of the UAV may continue with the flight plan, such as by performing the operations of block 418 as described.

In response to determining that the calculated probability for a collision with another UAV exceeds the safety threshold (i.e., determination block 604="Yes"), in response to determining that the target landing bay is obstructed (i.e., determination block 608="Yes"), or in response to determining that the UAV has lost track of the target landing bay (i.e., determination block 610="Yes"), the processor of the UAV may determine that the UAV has encountered an exception condition and end the method 600 in order to begin performing exception-handling operations, such as by performing the operations of block 426 as described.

Figure 7:
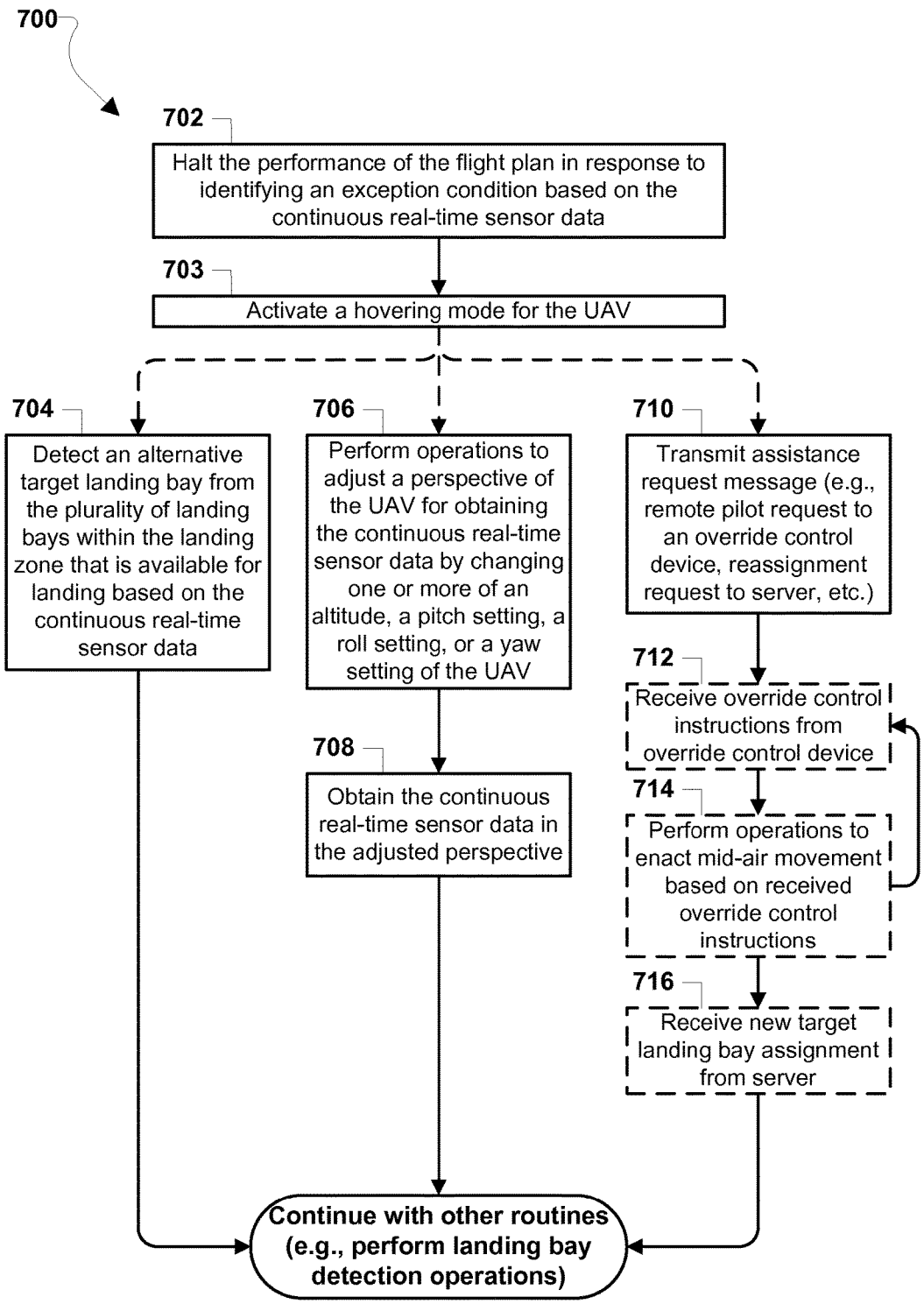
FIG. 7 is a process flow diagram illustrating a method performed by a processor of an autonomous UAV for performing exception-handling operations in response to encountering exception conditions while landing in a landing zone including a plurality of landing bays among a plurality of autonomous UAVs according to various embodiments.

FIG. 7 illustrates a method 700 performed by a processor of an autonomous UAV for performing exception-handling operations in response to encountering exception conditions while landing in a multi-bay landing zone among a plurality of autonomous UAVs according to various embodiments. In other words, the operations in method 700 may be performed by the UAV processor to manage encountered exception conditions and avoid dangerous, unsafe, or inefficient landing procedures. With reference to FIGS. 1-7, the various combinations of the operations of the method 700 may be performed by the UAV in response to determining that an exception condition exists (e.g., in place of the operations of block 426 of the method 400). The method 700 may be performed by a processor of a computing device (e.g., the processor 230 of the UAV 130a) that may utilize various modules for the various operations (e.g., modules 212-219).

In block 702, the processor of the UAV may halt performance of the flight plan in response to identifying an exception condition based on the continuous real-time sensor data. For example, when determining that continuing to move toward the target landing bay in the same manner as defined by the flight plan could cause a collision (e.g., a calculated probability of colliding with other UAVs or other objects is above a safety threshold, etc.), the UAV may stop executing the instructions of the flight plan at least until the exception is no longer present. In optional block 703, the processor of the UAV may also activate a hovering mode for the UAV to prevent proceeding into an unsafe location or circumstance. In some embodiments, the UAV may utilize a position control module 218 and/or a navigation module 216 when performing the operations of blocks 702-703.

The UAV may perform some of the operations of blocks 704-716 to address the exception condition, and particular operations of the blocks 704-718 may be performed in response to identifying particular exception conditions. For example, the operations of blocks 704-705 may be performed in response to detecting an obstruction in a target landing bay (i.e., determination block 608="Yes"). As another example, the operations of blocks 706-708 may be performed in response to losing track of the target landing bay in camera imagery (i.e., determination block 610="Yes"). As another example, the operations of blocks 710-718 may be performed in response to detecting a likely mid-air collision with an obstacle or another UAV. In some embodiments, any or all of the operations of blocks 704-718 may be performed by the UAV to correct or otherwise avoid various exception conditions.

In block 704, the processor of the UAV may detect an alternative target landing bay that is available for landing from the plurality of landing bays within the multi-bay landing zone based on the continuous real-time sensor data. For example, the UAV may evaluate camera imagery to identify an optimal (or closest) landing bay that has no other UAV within the boundaries of the landing bay and/or that is not currently assigned to another UAV.

In some embodiments, detecting the alternative target landing bay may include the UAV receiving wireless communications from other UAVs and/or a server that indicate the assigned or available landing bays. For example, the UAV may transmit request messages to nearby UAVs to identify corresponding assignments or intended landing bays and identify the alternative landing bay as a landing bay not already reserved, acquired, or selected for landing by the other UAVs. As another example, the UAV may transmit a request message to a server to provide an assignment to an open landing bay. In some embodiments, when no alternative landing bay is identified, the UAV may alternatively identify any flat surface suitable for landing and set that location within the landing zone to be the new selected target. In some embodiments, the processor of the UAV may set the detected alternative target landing bay as a current target landing bay. In some embodiments, the UAV may utilize an image-processing module 212 when performing the operations of blocks 704.

Based on the operations of 704, the UAV may be able to calculate an alternative orientation and alternative position coordinates for landing in an alternative target landing bay, adjust (or recalculate) the flight plan for landing in the alternative target landing bay based on the alternative orientation, the alternative position coordinates and a current orientation and position of the UAV, and/or perform the adjusted flight plan with subsequent operations, such as by performing subsequent operations in the method 400 as described.

In block 706, the processor of the UAV may perform operations to adjust a perspective of the UAV for obtaining the continuous real-time sensor data by changing one or more of an altitude, a pitch setting, a roll setting, or a yaw setting of the UAV. For example, the UAV may perform operations to cause the UAV to ascend to a higher altitude that may provide a better view of the landing zone and thus may be able to capture camera imagery including a larger number of landing bays for evaluation to identify open landing bays. The adjusted perspective may be additionally beneficial when the UAV has lost tracking lock on a target landing bay, such as due to winds, objects, shadows, etc., as the UAV may be better able to capture imagery enabling a broader search for the lost target landing bay. In some embodiments, the UAV may adjust basic configuration parameters, such as the camera that is used, the angle between the camera mount relative to the UAV body, etc., in response to the operations of block 706 so that subsequent coordinate transformation calculations may be accurate. In some embodiments, the UAV may adjust the perspective by reconfiguring the angle, rotation, focus, and/or other settings of the sensors individually, such as by causing a camera to rotate downwards independent of the UAV body. For example, the UAV may perform exception-handling operations that include adjusting one or more of a zoom setting of a camera and a focus setting of the camera. In some embodiments, the UAV may utilize a position control module 218 when performing the operations of block 706. In block 708, the processor of the UAV may begin obtaining the continuous real-time sensor data in the adjusted perspective.

In some circumstances that cannot be overcome by the autonomous functionalities of the UAV, the exception handling system of the UAV may request assistance or input from remote sources or a pilot. For example, when a new target landing bay cannot be detected within camera imagery and/or a probability of a collision with another UAV is high (e.g., a calculated collision probability is above safety threshold(s) or indicates a highly likely collision, etc.) with known movement parameters of an automated re-routing routines, the UAV may request a human remote pilot to provide override commands. Thus, in block 710, the processor of the UAV may transmit an assistance request message, such as a message over a wireless connection requesting override commands from an override control device (i.e., a remote server or device accessible via a network) and/or target landing bay reassignment data. For example, such an assistance request message may indicate that a human or robot is required for moving an obstacle on a landing bay device (e.g., a message requesting a human to manually move or remotely pilot a UAV off of a landing bay device). As another example, an assistance request message may be a signal to another device that includes instructions for moving a UAV that is blocking a landing bay device (e.g., a landing UAV may directly signal a blocking UAV to move, a landing drone may signal a server to cause the server to signal a blocking UAV to move, etc.). In cases where assistance request messages cause other UAVs to move to make way for the UAV, the other UAVs may perform various maneuvers in response, such as taking off to move to a new landing bay, to start a flight plan or mission, to move elsewhere, to hover, etc.

In optional block 712, the processor of the UAV may receive override control instructions from a remote pilot device (e.g., a server, a remote pilot console, etc.), and the processor may perform operations to enact mid-air movements based on the received override control instructions in optional block 714. In some embodiments, the mid-air movements may be assisted by functionalities of the UAV, such as auto-stabilization routines performed by the UAV. Such auto-stabilization routines may be performed without guidance from the remote pilot, or to correct improper inputs received from the remote pilot. In some embodiments, the UAV may utilize a position control module 218 when performing the operations of optional block 714.

In optional block 716, the processor of the UAV may receive a new target landing bay assignment from a server, such as a server configured to organize the use of landing bays within the landing zone. The processor of the UAV may end the method 700 and continue by performing operations, such as the detection operations of determination block 408 as described.

Figure 8:
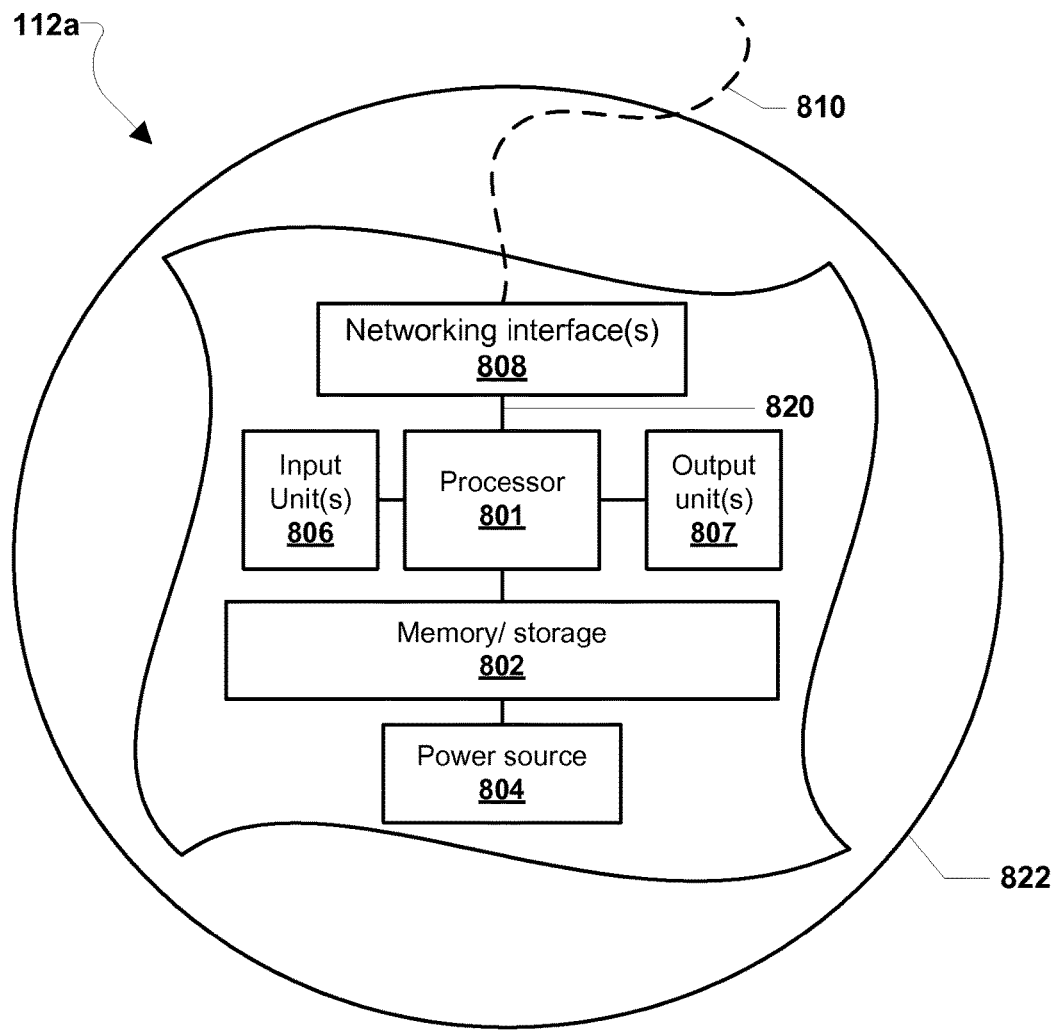
FIG. 8 is a component block diagram illustrating an exemplary landing bay device according to various embodiments.

FIG. 8 illustrates an exemplary landing bay device (e.g., 112a in FIG. 1) configured to dynamically render landing patterns according to some embodiments. With reference to FIGS. 1-8, the landing bay device 112a may include a processor 801 configured with processor-executable instructions to perform various operations. The processor 801 may be or include one or more multicore integrated circuits designated for general or specific processing tasks. The processor 801 may be coupled to various other modules or functionalities via a wired or wireless connectivity, such as via a bus 820 or other circuitry. In particular, the processor 801 may be connected to an internal memory 802 (and/or other storage), a power source 804 (e.g., a battery, a rechargeable lithium battery, a power plug capable of interfacing with a conventional power outlet, etc.), input unit(s) 806, and output unit(s) 807 (e.g., a light emitting diode (LED) screen, bulb(s), a screen, a speaker, etc.). For example, the output unit(s) 807 may include a screen for rendering various special landing patterns (e.g., 302a, 302b, 304a, 304b, 306). In some embodiments, the output unit(s) 807 may include a projector unit configured to project various information (e.g., images of landing symbols/patterns, messages, etc.) on a display surface of the landing bay device 112a.

The internal memory 802 may be volatile or non-volatile memory, and may also be secure and/or encrypted memory, or unsecure and/or unencrypted memory, or any combination thereof. In some embodiments, the input unit(s) 806 may include a weight or pressure sensor configured to detect items placed on top of the surface of the landing bay device 112a, such as a landed (or parked) UAV or a force exerted by the UAV while the UAV is overhead the landing bay device 112a. For example, a pressure sensor may detect or otherwise measure force from a certain type of drone at a certain height above the landing bay device 112a. In some embodiments, the landing bay device 112a may utilize such a pressure sensor to determine whether a UAV is partially overhead or otherwise aligned with the landing bay device 112a. For example, the landing bay device 112a may determine that a UAV is misaligned overhead or improperly parked in response to detecting a current pressure measurement that is less than an expected (or known) pressure value related to overhead force or landings of UAVs of the same type as the certain UAV.

In some embodiments, the landing bay device 112a may include a housing 822 that is configured to be placed within a floor. For example, the entire landing bay device 112a may be inserted into a recessed area of a warehouse floor associated with a particular landing bay. The housing 822 may be comprised of various materials suitable for protecting the various components of the landing bay device 112a, such as metal, plastic, and/or any combination thereof.

In some embodiments, the landing bay device 112a may include various networking interfaces 808 (and associated logic) connected to the processor 801. For example, the landing bay device 112a may include one or more radio transceivers and antenna for exchanging signals with remote devices (e.g., remote servers, UAVs, external transmitters, etc.) via various transmission protocols, standards, mediums, and configurations (e.g., Wi-Fi®, etc.). In some embodiments, the landing bay device 112a may utilize one or more connections 810 to other devices or networks for enabling communications, such as an Ethernet connection to an Internet access point.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described generally in terms of respective functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions, which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray Disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of an unmanned aerial vehicle (UAV) for controlling landing in a landing zone including a plurality of landing bays while flying among a plurality of other UAVs, comprising:
   receiving continuous real-time sensor data;
   detecting a target landing bay within the plurality of landing bays within the landing zone that is available for landing based on the continuous real-time sensor data;
   calculating an orientation and position coordinates for landing in the target landing bay based on the continuous real-time sensor data;
   obtaining information regarding positions and flight vectors of the plurality of other UAVs, wherein obtaining the information comprises:
      receiving position and flight vector reports from the plurality of other UAVs via a transceiver on board the UAV,
      wherein the UAV and the plurality of other UAVs are each independently executing a separate flight mission;
   generating a flight plan for landing in the target landing bay based on the orientation and the position coordinates, the positions and flight vector reports of the plurality of other UAVs, and a current orientation and position of the UAV;
   performing the flight plan for landing in the target landing bay;
   determining whether an exception condition is identified based on the continuous real-time sensor data and the flight plan for landing in the target landing bay; and
   in response to determining that an exception condition is identified:
      halting performance of the flight plan for landing in the target landing bay; and
      performing exception-handling operations based on the identified exception condition, wherein performing the exception-handling operations includes detecting an alternative target landing bay from the plurality of landing bays within the landing zone that is available for landing based on the continuous real-time sensor data by:
         performing operations to adjust a perspective of the UAV independent of any landing routine, the operations comprising one or more of:
            causing the UAV to ascend to a higher altitude above the landing zone, changing a pitch setting of the UAV, changing a roll setting of the UAV, or changing a yaw setting of the UAV; and
         obtaining the continuous real-time sensor data in the adjusted perspective.

2. The method of claim 1, wherein the continuous real-time sensor data is received from sensors on board the UAV.

3. The method of claim 2, wherein obtaining information regarding the positions and flight vectors of the plurality of other UAVs further comprises:
   obtaining camera imagery via a camera, wherein the camera is one of the sensors on board the UAV;
   tracking the plurality of other UAVs using the camera imagery; and
   calculating the positions and flight vectors of the plurality of other UAVs based on the camera imagery and the UAV's own position and flight vectors.

4. The method of claim 2, wherein detecting the target landing bay from the plurality of landing bays within the landing zone that is available for landing based on the continuous real-time sensor data comprises:
   obtaining camera imagery via a camera, wherein the camera is one of the sensors on board the UAV;
   determining whether the camera imagery includes imagery of an assigned landing bay; and
   detecting within the camera imagery of an open landing bay that is available for landing in response to determining that the camera imagery does not include the imagery of the assigned landing bay.

5. The method of claim 4, wherein the imagery of the assigned landing bay or the imagery of the open landing bay is imagery of a landing pattern that comprises at least a circle circumscribing an asymmetric symbol, wherein each hemisphere of the asymmetric symbol is different than an opposite hemisphere of the asymmetric symbol such that the landing pattern indicates a global orientation.

6. The method of claim 5, wherein calculating the orientation comprises:
   calculating the orientation based on a comparison of a current heading of the UAV to the global orientation of the asymmetric symbol in the imagery of the landing pattern.

7. The method of claim 1, wherein the continuous real-time sensor data is received via at least the transceiver on board the UAV.

8. The method of claim 1, further comprising continuously transmitting reports of the UAV's own position and flight vector via the transceiver.

9. The method of claim 1, wherein performing the exception-handling operations comprises:
   calculating an alternative orientation and alternative position coordinates for landing in the alternative target landing bay based on the continuous real-time sensor data;
   adjusting the flight plan for landing in the alternative target landing bay based on the alternative orientation, the alternative position coordinates, and the current orientation and position of the UAV; and
   performing the flight plan for landing in the alternative target landing bay.

10. The method of claim 1, wherein performing the exception-handling operations comprises:
   adjusting a parameter of a sensor on board the UAV that is configured to obtain the continuous real-time sensor data, wherein the parameter includes one or more of a zoom setting of a camera and a focus setting of the camera.

11. The method of claim 1,
   wherein determining whether an exception condition is identified based on the continuous real-time sensor data comprises:

determining whether the target landing bay is obstructed based on the continuous real-time sensor data; and wherein halting performance of the flight plan for landing in the target landing bay in response to identifying the exception condition comprises:
halting the flight plan for landing in the target landing bay in response to determining that the target landing bay is obstructed.

12. The method of claim 1,
wherein determining whether an exception condition is identified based on the continuous real-time sensor data comprises:
determining whether the UAV has lost track of the target landing bay based on the continuous real-time sensor data; and wherein halting performance of the flight plan for landing in the target landing bay in response to identifying the exception condition comprises:
halting the flight plan for landing in the target landing bay in response to determining that the UAV has lost track of the target landing bay based on the continuous real-time sensor data.

13. The method of claim 1,
wherein determining whether an exception condition is identified based on the continuous real-time sensor data and the flight plan for landing in the target landing bay comprises:
continuously monitoring positions and flight vectors of the plurality of other UAVs while performing the flight plan for landing in the target landing bay; and
calculating a probability of a mid-air collision occurring with one or more of the plurality of other UAVs while following the flight plan for landing in the target landing bay based on the positions and flight vectors of the plurality of other UAVs; and wherein performing the exception-handling operations based on the identified exception condition comprises:
adjusting the flight plan for landing in the target landing bay in response to determining that the calculated probability of the mid-air collision occurring exceeds a safety threshold.

14. The method of claim 1, further comprising:
determining whether the UAV is beginning an approach into the landing zone based on the continuous real-time sensor data,
wherein detecting the target landing bay from the plurality of landing bays within the landing zone that is available for landing based on the continuous real-time sensor data comprises:
detecting the target landing bay within the landing zone based on the continuous real-time sensor data in response to determining that the UAV is beginning the approach.

15. The method of claim 14, wherein determining that the UAV is beginning the approach into the landing zone based on the continuous real-time sensor data comprises:
comparing coordinates of the UAV from the continuous real-time sensor data to coordinates for the landing zone.

16. The method of claim 14, wherein determining that the UAV is beginning the approach into the landing zone based on the continuous real-time sensor data comprises:
detecting imagery of the landing zone within the continuous real-time sensor data.

17. The method of claim 1, wherein calculating the position coordinates for landing in the target landing bay based on the continuous real-time sensor data comprises:
calculating a center point of the surface of the target landing bay.

18. The method of claim 1, wherein the continuous real-time sensor data includes one or more of location data received from global positioning system receiver, audio data from a microphone, movement data from an accelerometer, and orientation data from a gyroscope.

19. A computing device, comprising:
a memory;
a transceiver; and
a processor coupled to the memory and configured with processor-executable instructions to:
receive continuous real-time sensor data;
detect a target landing bay within a plurality of landing bays within a landing zone that is available for landing based on the continuous real-time sensor data;
calculate an orientation and position coordinates for landing in the target landing bay based on the continuous real-time sensor data;
obtain information regarding positions and flight vectors of a plurality of other UAVs operating within the landing zone by:
receiving position and flight vector reports from the plurality of other UAVs via the transceiver,
wherein the UAV and the plurality of other UAVs are each independently executing a separate flight mission;
generate a flight plan for landing in the target landing bay based on the orientation and the position coordinates, the positions and flight vector reports of the plurality of other UAVs, and a current orientation and position of the computing device;
perform the flight plan for landing in the target landing bay;
determine whether an exception condition is identified based on the continuous real-time sensor data and the flight plan for landing in the target landing bay; and
in response to determining that an exception condition is identified:
halt performance of the flight plan for landing in the target landing bay; and
perform exception-handling operations based on the identified exception condition, wherein the exception-handling operations include detecting an alternative target landing bay from the plurality of landing bays within the landing zone that is available for landing based on the continuous real-time sensor data by:
performing operations to adjust a perspective of the UAV independent of any landing routine, the operations comprising one or more of:
causing the UAV to ascend to a higher altitude above the landing zone, changing a pitch setting of the UAV, changing a roll setting of the UAV, or changing a yaw setting of the UAV; and
obtaining the continuous real-time sensor data in the adjusted perspective.

20. The computing device of claim 19, wherein the computing device is within an unmanned aerial vehicle (UAV).

21. The computing device of claim 19,
wherein the computing device further comprises sensors, and
wherein the continuous real-time sensor data is received via the sensors, the transceiver, or both.

22. The computing device of claim 21, wherein the processor is further configured with processor-executable instructions to:
continuously transmit reports of the computing device's own position and flight vector via the transceiver.

23. The computing device of claim 21,
wherein the processor is further configured with processor-executable instructions to obtain information regarding the positions and flight vectors of the plurality of other UAVs by:
obtaining camera imagery via a camera, wherein the camera is one of the sensors;
tracking the plurality of other UAVs using the camera imagery; and
calculating the positions and flight vectors of the plurality of other UAVs based on the camera imagery and the computing device's own position and flight vectors.

24. A non-transitory processor-readable storage medium having stored thereon processor-executable instructions configured to cause a processor of a computing device of an unmanned aerial vehicle (UAV) to perform operations comprising:
receiving continuous real-time sensor data;
detecting a target landing bay within a plurality of landing bays within a landing zone that is available for landing based on the continuous real-time sensor data;
calculating an orientation and position coordinates for landing in the target landing bay based on the continuous real-time sensor data;
obtaining information regarding positions and flight vectors of a plurality of other UAVs operating within the landing zone, wherein obtaining the information comprises:
receiving position and flight vector reports from the plurality of other UAVs via a transceiver on board the UAV,
wherein the UAV and the plurality of other UAVs are each independently executing a separate flight mission;
generating a flight plan for landing in the target landing bay based on the orientation and the position coordinates, the positions and flight vector reports of the plurality of other UAVs, and a current orientation and position of the UAV;
performing the flight plan for landing in the target landing bay;
determining whether an exception condition is identified based on the continuous real-time sensor data and the flight plan for landing in the target landing bay; and
in response to determining that an exception condition is identified:
halting performance of the flight plan for landing in the target landing bay; and
performing exception-handling operations based on the identified exception condition, wherein the exception-handling operations include detecting an alternative target landing bay from the plurality of landing bays within the landing zone that is available for landing based on the continuous real-time sensor data by:
performing operations to adjust a perspective of the UAV independent of any landing routine, the operations comprising one or more of:
causing the UAV to ascend to a higher altitude above the landing zone, changing a pitch setting of the UAV, changing a roll setting of the UAV, or changing a yaw setting of the UAV; and
obtaining the continuous real-time sensor data in the adjusted perspective.

25. A computing device, comprising:
means for receiving continuous real-time sensor data;
means for detecting a target landing bay within a plurality of landing bays within a landing zone that is available for landing based on the continuous real-time sensor data;
means for calculating an orientation and position coordinates for landing in the target landing bay based on the continuous real-time sensor data;
means for obtaining information regarding positions and flight vectors of a plurality of other UAVs operating within the landing zone, wherein means for obtaining the information comprises:
means for receiving position and flight vector reports from the plurality of other UAVs,
wherein the UAV and the plurality of other UAVs are each independently executing a separate flight mission;
means for generating a flight plan for landing in the target landing bay based on the orientation and the position coordinates, the positions and flight vector reports of the plurality of other UAVs, and a current orientation and position of the computing device;
means for performing the flight plan for landing in the target landing bay;
means for determining whether an exception condition is identified based on the continuous real-time sensor data and the flight plan for landing in the target landing bay;
means for halting performance of the flight plan for landing in the target landing bay in response to determining that an exception condition is identified; and
means for performing exception-handling operations based on the identified exception condition in response to determining that an exception condition is identified, comprising means for detecting an alternative target landing bay from the plurality of landing bays within the landing zone that is available for landing based on the continuous real-time sensor data, wherein the means for detecting the alternative target landing bay further comprises:
means for performing operations to adjust a perspective of the UAV independent of any landing routine, comprising one or more of:
means for causing the UAV to ascend to a higher altitude above the landing zone, means for changing a pitch setting of the UAV, means for changing a roll setting of the UAV, or means for changing a yaw setting of the UAV; and
means for obtaining the continuous real-time sensor data in the adjusted perspective.

* * * * *